United States Patent
Hashimoto et al.

(10) Patent No.: US 9,507,789 B2
(45) Date of Patent: Nov. 29, 2016

(54) SYSTEM, RELAY SERVER APPARATUS, INFORMATION PROCESSING METHOD AND COMPUTER-READABLE MEDIUM

(71) Applicants: Canon U.S.A., Inc., Melville, NY (US); Canon Information and Imaging Solutions, Inc., Melville, NY (US)

(72) Inventors: Hiroshi Hashimoto, Glen Cove, NY (US); Satoshi Kanemune, Yokohama (JP)

(73) Assignees: Canon Information and Imagin Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 193 days.

(21) Appl. No.: 13/914,981

(22) Filed: Jun. 11, 2013

(65) Prior Publication Data

US 2013/0346361 A1 Dec. 26, 2013

Related U.S. Application Data

(60) Provisional application No. 61/658,196, filed on Jun. 11, 2012.

(30) Foreign Application Priority Data

Dec. 11, 2012 (JP) .................. 2012-270471

(51) Int. Cl.
*G06F 17/30* (2006.01)
*H04N 1/00* (2006.01)
(Continued)

(52) U.S. Cl.
CPC ....... *G06F 17/30115* (2013.01); *G06F 3/1218* (2013.01); *G06F 3/1267* (2013.01);
(Continued)

(58) Field of Classification Search
CPC .......... H04L 67/2838; H04L 67/2842; H04N 1/00957; H04N 1/3208; G06F 3/1288; G06F 3/1267; G06F 3/1218; G06F 3/1273; G06F 3/1287; G06F 3/1262; G06F 17/30011
USPC .................................. 707/609, 616
See application file for complete search history.

(56) References Cited

U.S. PATENT DOCUMENTS 5,604,860 A   2/1997   McLaughlin et al.
7,281,049 B2  10/2007  Verma et al.
(Continued)

FOREIGN PATENT DOCUMENTS

JP    10021134       1/1998
JP    2003141021 A   5/2003
(Continued)

*Primary Examiner* — Robert Beausoliel, Jr.
*Assistant Examiner* — Pedro J Santos
(74) *Attorney, Agent, or Firm* — Canon U.S.A., Inc., IP Division

(57) ABSTRACT

A system in which an information processing apparatus, relay server apparatus, and management server apparatus are connected via the network, wherein the said information processing apparatus possesses a unit to send a request to merge files managed by the said management server to the said relay server apparatus, and the said relay server apparatus possesses a unit to receive the said merge request from the said information processing apparatus, to determine whether the merged file created based on the said merge request received using the said receiving unit is stored in the memory area of the said relay server apparatus, and to retrieve the said merged file from the said memory area if it is determined that the merged file is stored in the said memory area using the said determination unit solves the problem.

19 Claims, 34 Drawing Sheets

(51) Int. Cl.
*H04N 1/32* (2006.01)
*H04L 29/08* (2006.01)
*G06F 3/12* (2006.01)

(52) U.S. Cl.
CPC ......... *G06F3/1288* (2013.01); *H04L 67/2838* (2013.01); *H04L 67/2842* (2013.01); *H04N 1/00957* (2013.01); *H04N 1/3208* (2013.01); *G06F 3/1262* (2013.01); *G06F 3/1273* (2013.01); *G06F 3/1287* (2013.01); *G06F 2206/1514* (2013.01)

(56) References Cited

U.S. PATENT DOCUMENTS

| | | | |
|---|---|---|---|
| 7,665,029 B2 | 2/2010 | Nakajima | |
| 8,139,256 B2 | 3/2012 | Motamed | |
| 8,392,843 B2 | 3/2013 | Corona | |
| 2003/0011633 A1 | 1/2003 | Conley et al. | |
| 2006/0173884 A1* | 8/2006 | Lin et al. | 707/101 |
| 2006/0242570 A1* | 10/2006 | Croft et al. | 715/517 |
| 2007/0002392 A1 | 1/2007 | Ogura | |
| 2010/0257218 A1* | 10/2010 | Vassilev et al. | 707/823 |
| 2012/0185516 A1* | 7/2012 | Xu | 707/803 |
| 2013/0124954 A1* | 5/2013 | Rowe et al. | 715/205 |
| 2013/0145349 A1* | 6/2013 | Basak et al. | 717/121 |

FOREIGN PATENT DOCUMENTS

| | | |
|---|---|---|
| JP | 2005094056 A | 4/2005 |
| JP | 2008022171 A | 1/2008 |
| JP | 2011151840 A | 8/2011 |
| JP | 2011188537 A | 9/2011 |

* cited by examiner

900 Update Folder Management Table

| Folder ID | Document Server Name | Folder Path |
|---|---|---|
| FolderID001 | docserver01 | ¥¥AAA¥Share¥ |
| FolderID002 | docserver02 | ¥¥BBB¥pricelist¥ |
| FolderID003 | docserver03 | ¥¥CCC¥kakaku¥ |
| ⋮ | ⋮ | ⋮ |

Figure 9A

910 Document Management Table

| Document ID | Document Name | Document Server Name | Folder Path |
|---|---|---|---|
| DocID001 | Cover Page A | docserver01 | ¥¥Project¥ |
| DocID002 | Cover Page B | docserver02 | ¥¥BBB¥Hyoushi¥ |
| DocID003 | Advertisement C | docserver01 | ¥¥AAA¥Share¥ |
| DocID004 | Cover Page D | docserver02 | ¥¥BBB¥Hyoushi¥ |
| DocID005 | Cover Page E | docserver02 | ¥¥BBB¥Hyoushi¥ |
| DocID006 | Spreadsheet F | docserver03 | ¥¥documents¥xls¥ |
| DocID007 | Customer Information G | docserver01 | ¥¥AAA¥Customer¥ |
| DocID008 | Price List H | docserver03 | ¥¥CCC¥Kakku¥ |
| ⋮ | ⋮ | ⋮ | ⋮ |

Figure 9B

1200 History Information Table

| Merged Document ID 1201 | User ID 1202 | Merged Document 1203 | Merged Document 1204 | Merged Document 1205 | Process Type 1206 | Process Setting 1207 | Update Folder Document 1208 | Date/Time Last Used 1209 |
|---|---|---|---|---|---|---|---|---|
| ComID001 | UserA | Cover Page A | Advertisement C | Spreadsheet F | Print | Duplex, color, 2 copies | Advertisement C | 2012/10/26 10:31:57 |
| ComID002 | UserA | Cover Page A | Customer Information G | Spreadsheet F | FAX | 03-XXXX-XXXX | — | 2012/10/22 09:20:49 |
| ComID003 | UserA | Cover Page A | Customer Information G | Price List H | E-mail | hogehoge@xxx.com | Price List H | 2012/10/29 14:01:10 |
| ComID004 | UserB | ... | ... | ... | ... | ... | ... | ... |
| ComID005 | UserB | ... | ... | ... | ... | ... | ... | ... |
| ComID006 | UserC | ... | ... | ... | ... | ... | ... | ... |
| ... | ... | ... | ... | ... | ... | ... | ... | ... |

Figure 12

| | |
|---|---|
| 2801 | POST /esg/tutorial/DocSendUI HTTP/1.1 |
| 2802 | Accept:image/gif,image/x-xbitmap,image/jpeg,image/pjpeg, application/x-***, application/vnd.ms-*, application/vnd.ms-***, application/msword, application/xaml+xml, application/x-ms-xbap, application/x-ms-application */*. |
| 2803 | Referer: http://esg-dolphin:13001/esg/tutorial/DocSendUI |
| 2804 | Accept-Language: en-us |
| 2805 | Content-Type: application/x-www-form-urlencoded |
| 2806 | UA-CPU x86 |
| 2807 | Accept-Encoding: gzip, deflate |
| 2808 | User-Agent: *****/4.0(compatible; MSIE 7.0; ***** NT 5.1; .NET CLR 1.1.4322; InfoPath.2; .NET4.0C; .NET4.0E; .NET CLR 2.0.50727; .NET CLR 3.0.4506.2152; .NET CLR 3.5.30729) |
| 2809 | Host: esg-dolphin:13001 |
| 2810 | Content-Length: 137 |
| 2811 | Connection: Keep-Alive |
| 2812 | Cache-Control no-cache |
| 2813 | Cookie: JSESSIONID=wyBQP2NGldpQhvYyR1Z1t9XgPThfZh9MRsptq4TXp16Tgdvxvz5dl-266891871 |
| 2814 | PrintCheckbox=1&PrintCheckbox=2&PrintCheckbox=3&PrintCheckbox=4&PrintCheckbox=5&EmailCheckbox=1&EmailCheckbox=2&PrinterObjectName=PrinterX&FaxObjectName=&faxNo=&EmailAddress=suzuki@canon.com&EmailMerge=&FileProtocol=SMB&FilePath=&FileMerge=&ButtonPressed=SEND |

Figure 22

```
<sendResponse>
    <status>Completed</status>              ~~~3001
    <errorInfo></errorInfo>              ~~~ 3002
</sendResponse>
```

Figure 29

<Document Send>

Category    :File Title

☐ Notification    :A00001-N.pdf
☐ Contract    :A00001-C.pdf

...

Fax Object Name    Printer Object Name  Foder

[    ]    [    ]  ┆
Fax Number       ┆
[    ]           ┊

Email Address

[    ]

[ E-mail ]   [ Fax ]   [ Print ]   [ Store ]

Figure 31

SYSTEM, RELAY SERVER APPARATUS, INFORMATION PROCESSING METHOD AND COMPUTER-READABLE MEDIUM

CROSS-REFERENCE TO RELATED APPLICATIONS

This application claims the benefit of U.S. Provisional Application No. 61/658,196, filed Jun. 11, 2012, and this application claims the benefit of Japanese Patent Application No. 2012-270471, filed Dec. 11, 2012, both of which are hereby incorporated by reference herein in their entirety.

BACKGROUND OF THE INVENTION

1. Field of the Invention

The present invention relates to a system, relay server apparatus, information processing method, and computer-readable medium.

2. Description of the Related Art

Traditionally, various documents created on a client PC were stored and managed in the hard disk installed on the client PC. However, as networks developed and improved communication speed and stable communication materialized, documents saved on client PCs began to be saved on the server connected to the client PC via the network.

Especially in the recent years, many services that are available via the network, such as cloud computing, have emerged. Some examples of the services that are provided in this manner include CRM (Customer Relationship Management) and ERP (Enterprise Resource Planning) systems. A variety of other services, such as online storage services, which offer disk spaces on the server, have also been provided.

Since users now upload the documents, which were previously managed by the client PC, to the server, communication from the client PC to the server occurs. That increases the network traffic and puts greater load on the server. As network traffic increases, communication rate decreases. Also, increased load on the server results in decreased server bandwidth, which may result in the server shutting down.

The following mechanism is disclosed in the following Patent Document 1: Japanese Unexamined Patent Application Publication No. H10-21134. First, there is a gateway apparatus that relays the communication between the client PC and server. When the client PC sends a request to the server to retrieve a document, the gateway apparatus caches the document it retrieved from the server based on the request within the gateway apparatus. If it receives another request for the server to retrieve the same document, it transfers the cached document to the client PC and thus reduces the load on the network and server.

BRIEF SUMMARY OF THE INVENTION

In using multiple aforementioned services, documents may be saved on multiple servers. For example, user may save a product brochure on a server that handles document management and an estimate for each customer on a server that handles customer management.

In such cases, a relay server similar to the gateway apparatus described in Patent Document 1 may be installed. The relay server described in Patent Document 1 retrieves the brochure and estimate from the server that handles document management and server that handles customer management, respectively. The brochure and estimate are merged on the relay server into one document and transferred to the client PC.

In the technology described in aforementioned Patent Document 1, when the relay server needs to merge the documents, the relay server needs to merge the multiple documents it retrieved, which resulted in a problem that the relay server would get overloaded. If the number of documents it must merge or the document size is too large, its load would be even greater.

Also, with relay servers, one relay server unit is not allocated to each user. At companies, all the employees request documents that are stored on various servers to be retrieved and merged via one relay server unit (or several at most). As a result, many merge processes are executed. Since the merge process results in greater load on the server than the send/receive process, companies must reduce such processing load. Otherwise, the relay server might shut down, not being able to withstand the processing load caused by a large number of merge processes.

This invention is based on such problems. Its objective is to retrieve the merged document that the user requested while reducing the processing load of the relay server.

Present invention comprises an information processing apparatus, relay server apparatus, and management server apparatus connected by the network. Aforementioned information processing apparatus possesses a means to send the request to merge files that the aforementioned management server apparatuses manage, and the aforementioned relay server apparatus possesses a means to receive the aforementioned merge request from the aforementioned information processing apparatus, a means to determine whether the merged file created based on the aforementioned merge request received using the aforementioned receiving means is stored in the storage area of the aforementioned relay server apparatus, and a means to retrieve the aforementioned merged file from the aforementioned storage area if it is determined that the merged file is stored in the storage area by the aforementioned determination means.

Present invention enables retrieval of merged documents that a user wishes to retrieve while reducing the processing load of the relay server.

BRIEF DESCRIPTION OF THE DRAWINGS

FIG. 9A illustrates a sample updated folder management table.

FIG. 9B illustrates a sample document management table.

FIG. 12 illustrates a sample history information table.

FIG. 22 illustrates a sample message information in embodiment 3.

FIG. 29 illustrates a sample response information in embodiment 3.

FIG. 31 illustrates a sample list page in a common format in embodiment 3.

DETAILED DESCRIPTION OF THE INVENTION

Hereinafter, embodiments of the present invention will be described, referring to figures.

Hereinafter, embodiment 1 will be described.

Figure 1:
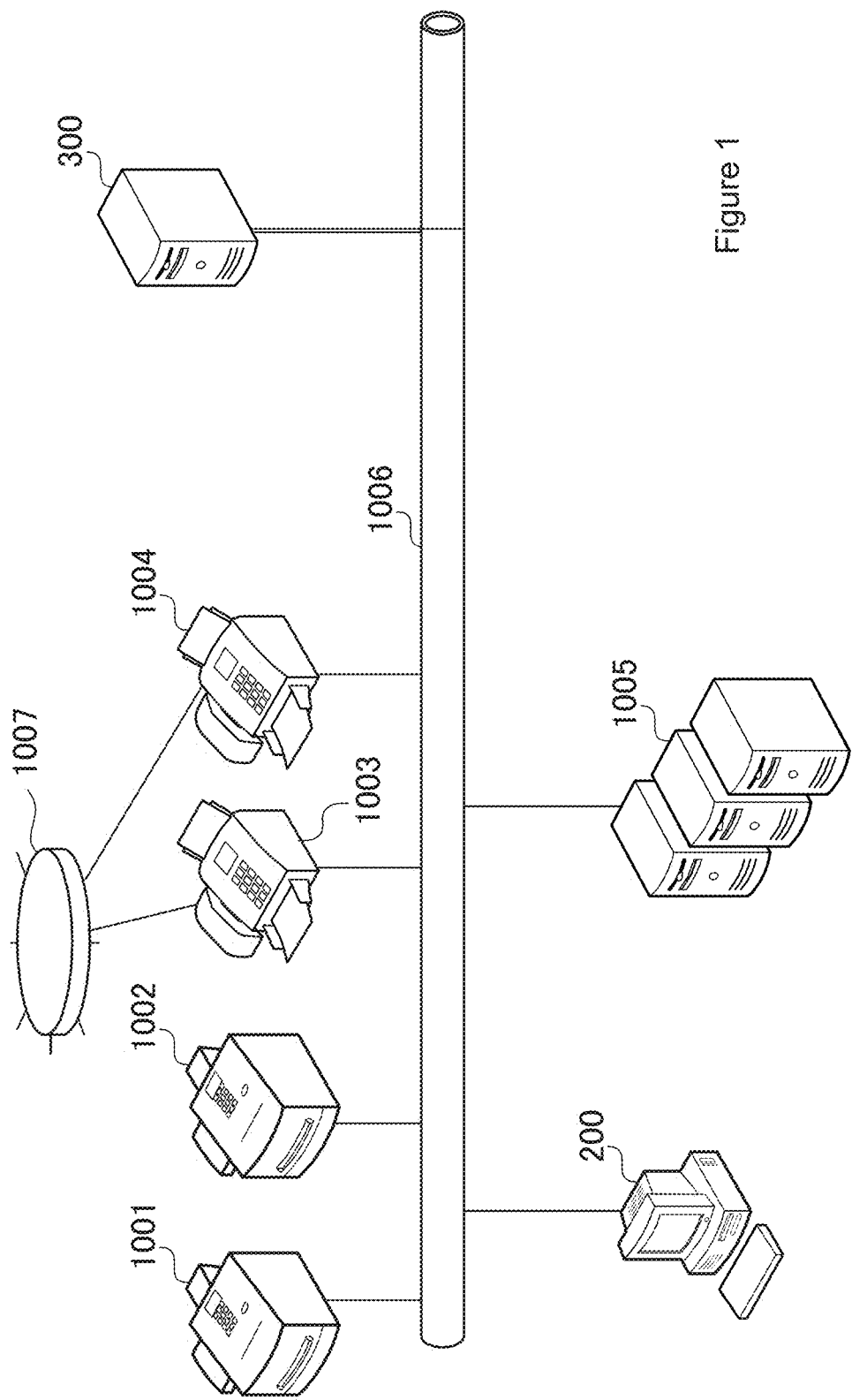
FIG. 1 illustrates a sample system configuration.

FIG. 1 illustrates a sample system configuration of this embodiment.

Printers 1001 and 1002 may be MFPs that have such functions as facsimile and scanner in addition to the print function.

FAX machines 1003 and 1004 may have other functions in addition to the FAX transmission function. FAX Machines 1003 and 1004 can communicate with other FAX machines at other locations via Public Circuit 1007.

Printers 1001 and 1002 and FAX Machines 1003 and 1004 are each interconnected to Client PC 200 and Relay Server 300 via the network 1006. Client PC 200 is an example of an information processing apparatus.

Relay Server 300 may comprise multiple physical server apparatuses, or it may comprise one server. Services and adapters are set up on Relay Server 300. These services and adapters are executed by one or more CPUs on Relay Server 300. Details will be described later using FIG. 3.

Client PC 200 communicates with Relay Server 300 using a web browser, for example. Client PC 200 receives information related to GUI provided from Relay Server 300 and displays it on Client PC 200's display.

Various documents created on Client PC 200 are stored on Document Server 1005. Document Server 1005 sends the saved documents to Relay Server 300 in response to requests from Relay Server 300. Document Server 1005 is an example of a management server apparatus. Document is an example of a file.

Figure 2:
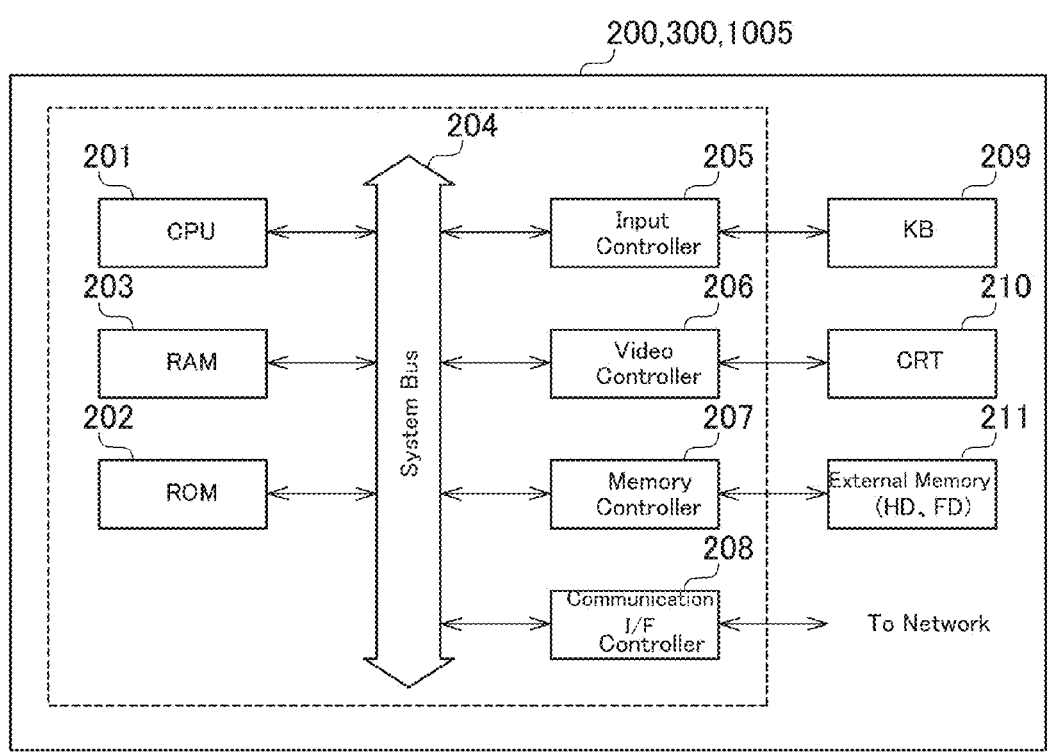
FIG. 2 illustrates a sample hardware configuration with a client PC, relay server, and document server.

FIG. 2 illustrates a sample hardware configuration of Client PC 200, Relay Server 300, and Document Server 1005.

CPU 201 of Client PC 200 realizes the functionality (software configuration) of Client PC 200 by executing the program stored in ROM 202 and the like. Similarly, CPU 201 of Client PC 200 realizes the processes related to the flowchart of Client PC 200, which will be described later, by executing the said program.

CPU 201 of Relay Server 300 realizes the functions (software configuration) of Relay Server 300 by executing the program stored in ROM 202 or another storage area. Similarly, CPU 201 of Relay Server 300 realizes the processes related to the flowchart of Relay Server 300, by executing the said program, which will be described later.

CPU 201 of Document Server 1005 realizes the functionality (software configuration) of Document Server 1005 by executing the program stored in ROM 202 or another storage area. Similarly, CPU 201 of Document Server 1005 realizes the processes related to the flowchart of Document Server 1005 by executing the said program, which will be described later.

BIOS (Basic Input/Output System), which is CPU 201's control program, operating system program (hereinafter OS), and such are stored in ROM 202 and external memory 211. Also, a variety of programs and such that are required for realizing the functionality that each server or each PC executes are stored in ROM 202 and external memory 211.

RAM 203 functions as CPU 201's main memory, work area, and such. CPU 201 loads the program that is required for executing a process on RAM 203 and executes the program to realize each action.

Input Controller (hereinafter "IC") 205 controls inputs from input devices such as Keyboard (hereinafter "KB") 209 and mouse.

Video Controller (hereinafter "VC") 206 controls displays on such displays as CRT Display (hereinafter "CRT") 210 and others. Display apparatus may not only be CRT 210 but also a liquid crystal display.

Memory Controller (hereinafter "MC") 207 controls accesses to External Memory 211, on which boot program, browser software, various applications, font data, user files, files to be edited, and various data, among others, are stored.

External Memory 211 is a card-type memory, among others, which is connected to the hard disk (hereinafter "HD"), flexible disk (hereinafter "FD"), and PC MCIA card slot via an adapter. External 211, RAM 203, ROM 202 are examples of a memory area.

Communication I/F Controller (hereinafter "Communication I/FC") 208 connects to and communicates with external devices via the network and executes communication control on the network. For example, I/FC 208 enables connection to the Internet using TCP/IP.

CPU 201 enables display of outline fonts on CRT 210 by rasterizing them in the display information area within RAM 203, for example. CPU 201 also enables user instructions using a mouse cursor, among others, on CRT 210.

Next, functional configuration of Client PC 200, Relay Server 300, and Document Server 1005 will be described using FIG. 3.

Figure 3:
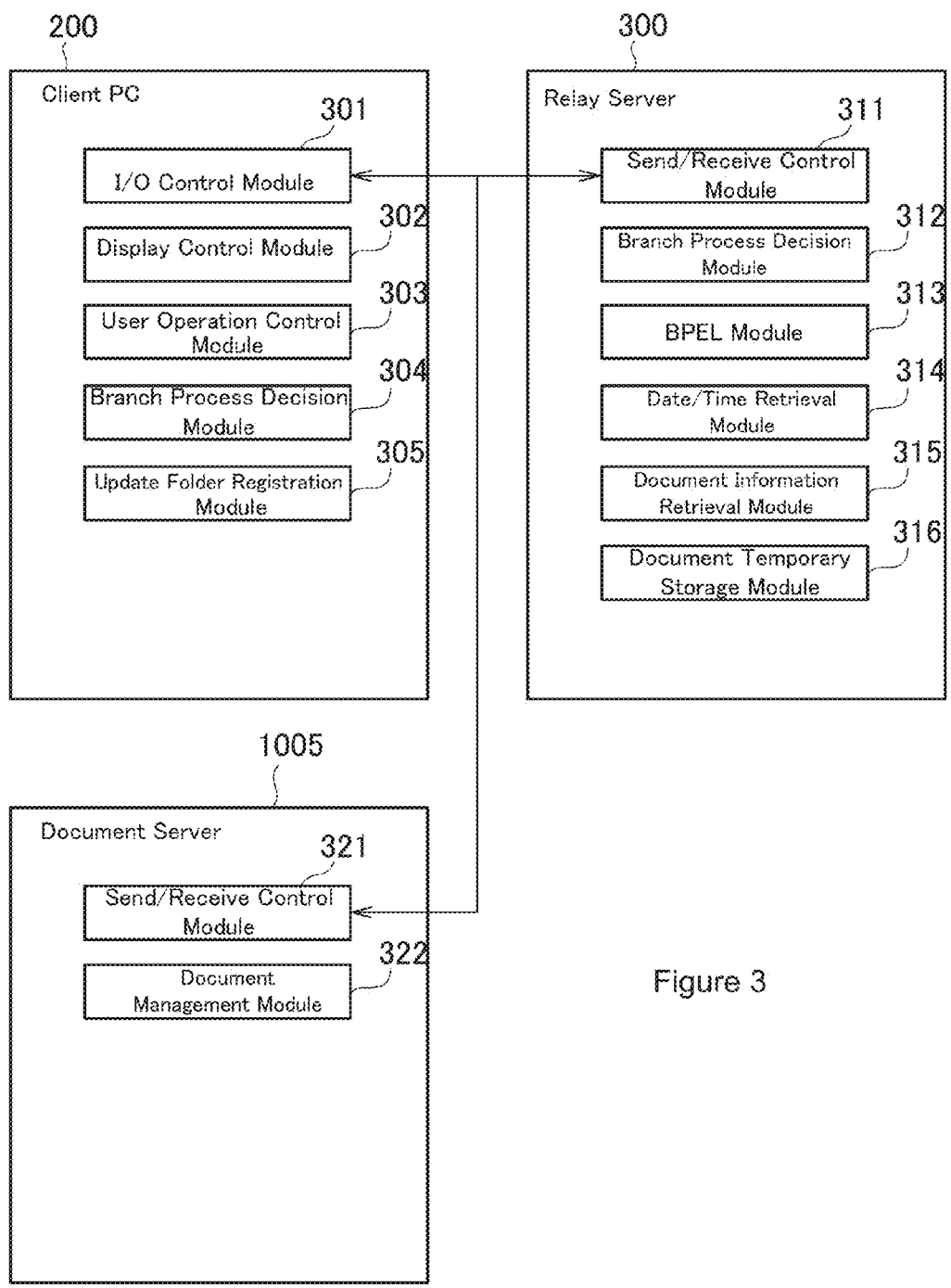
FIG. 3 illustrates a sample functional configuration with a client PC, relay server, and document server.

FIG. 3 illustrates a sample functional configuration of Client PC 200, Relay Server 300, and Document Server 1005. Terminal and server module configurations in FIG. 3 are merely examples. Many possible configurations exist depending on the usage and/or objective. Various modules may also be libraries.

Client PC 200 comprises Send/Receive Control Module 301, Display Control Module 302, User Operation Control Module 303, Branch Process Decision Module 304, and Update Folder Registration Module 305.

Send/Receive Control Module 301 sends and receives information to and from Send/Receive Control Module 311 on Relay Server 300 and Send/Receive Control Module 321 on Document Server 1005 using a designated communication protocol.

Display Control Module 302 controls the display on CRT 210 on Client PC 200.

User Operation Control Module 303 detects user operation entered from the input area of Client PC 200 and acts accordingly.

Branch Process Decision Module 304 controls the various decisions executed on Client PC 200.

Update Folder Registration Module 305 registers folders whose documents may be updated (hereinafter "update folder"). Update Folder Registration Module 305 may be installed on Relay Server 300 and not Client PC 200. That is, it is a configuration in which Client PC 200 enables the functions of Update Folder Registration Module 305 on Relay Server 300 via a web browser.

Relay Server 300 comprises Send/Receive Control Module 311, Branch Process Decision Module 312, BPEL Module 313, Date/Time Retrieval Module 314, Document Information Retrieval Module 315, and Document Temporary Storage Module 316.

Send/Receive Control Module 311 sends and receives information to and from Send/Receive Control Module 301 on Client PC 200 and Send/Receive Control Module 321 on Document Server 1005 using a designated communication protocol.

Branch Process Decision Module 312 controls the various decisions executed on Relay Server 300.

BPEL Module 313 is a framework that will be described later in FIG. 4.

Date/Time Retrieval Module 314 retrieves the current date and time set on Relay Server 300.

Document Information Retrieval Module 315 retrieves information on document bibliography (hereinafter "bibliography information") stored on Document Server 1005 and stores it in RAM 203 and other memory areas.

Document Temporary Storage Module 316 merges the documents stored on Document Server 1005 using BPEL Module 313 and stores the said merged document (hereinafter "merged document") in a designated memory area of RAM 203 and such. Merged document is an example of a merged file (hereinafter "merged file").

Document Server 1005 comprises Send/Receive Control Module 321 and Document Management Module 322.

Send/Receive Control Module 321 sends and receives information to and from Send/Receive Control Module 301 on Client PC 200 and Send/Receive Control Module 311 on Relay Server 300 using a designated communication protocol.

Document Management Module 322 manages documents generated on Client PC 200. Document Management Module 322 retrieves documents stored on Document Server 1005 and sends them to Relay Server 300 as needed. Document Management Server 322 also sends the bibliography information related to the document to Relay Server 300 as needed.

Figure 4:
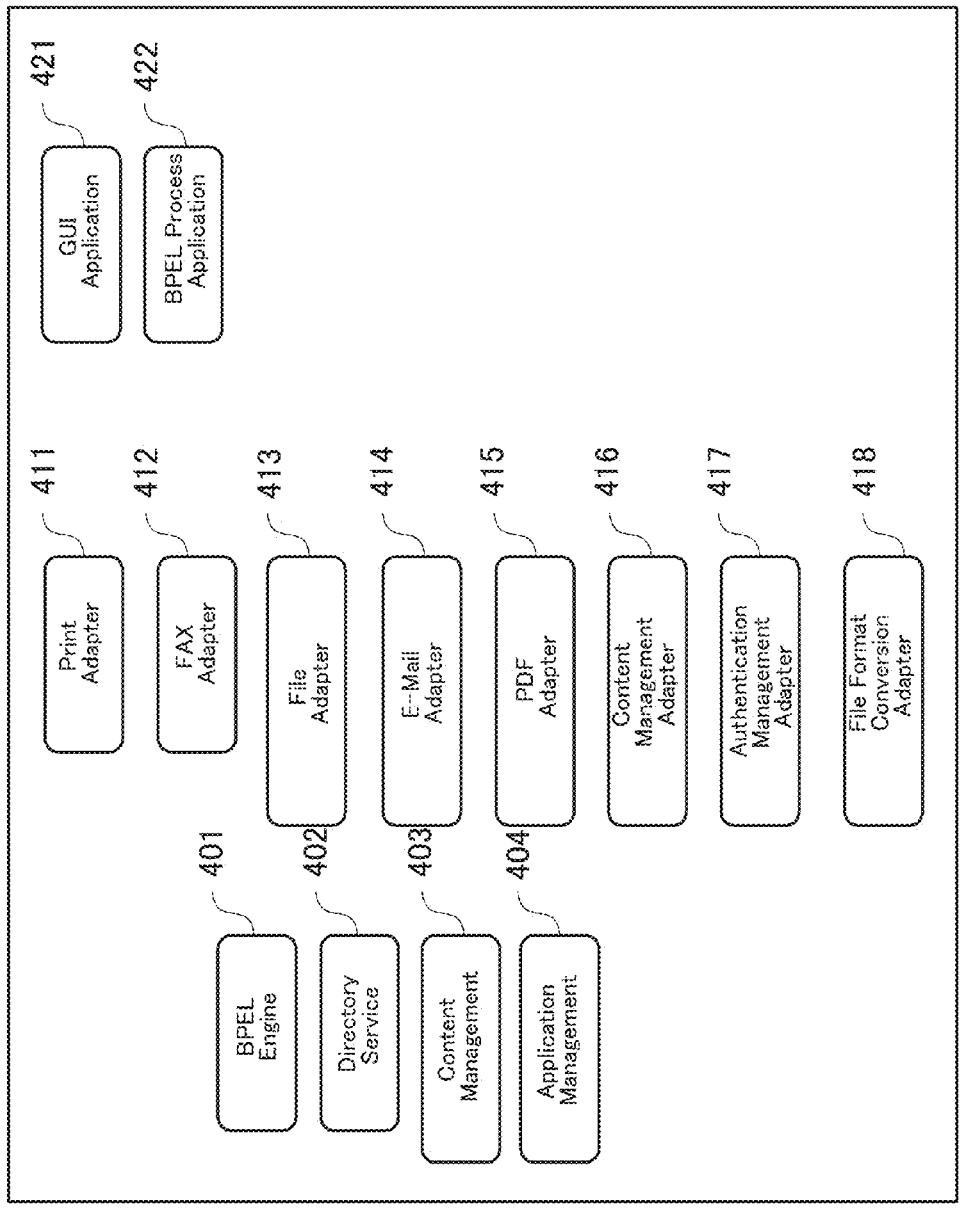
FIG. 4 illustrates a sample framework implemented on the relay server.

FIG. 4 illustrates a sample framework of this embodiment implemented on Relay Server 300.

BPEL Engine 401 executes BPEL Process. BPEL is short for Business Process Execution Language. BPEL Process is described as XML files. Using the BPEL design tool enables the designer to define the process using GUI's drag-and-drop operation.

BPEL is developed by an industry standard organization. With BPEL, multiple processes (for example, operation tasks) can be defined like workflows. For example, the designer can define a process that calls multiple Web Services using the design tool. Also, since BPEL Process itself is a Web Service, a procedure similar to a process that calls other Web Services can be used to call BPEL Process. In addition, it is possible to call another BPEL Process from a BPEL Process. In this embodiment, a flow in which multiple adapters (which are substantially multiple Web Services) are merged can be defined using BPEL. Adapters 411 to 418, which will be described later, are Web Services that can each be called using BPEL. Each execution control procedure, among others, is defined by BPEL as a workflow.

Directory Service 402 manages user information and authenticates users. User information may or may not be managed within Directory Service 402. If user information is not managed within Directory Service 402, Directory Service 402 collaborates with an external authentication server, such as Active Directory, and executes user information inquiries and user authentications on the external authentication server.

Electronic files such as documents, images, and videos are stored and managed on Content Management 303. This function does not need to be located on the same server.

Application Management 404 is an engine that executes an arbitrary application created by a user or manages the installation status, among others.

Print Adapter is an adapter that executes printing. Print Adapter 411 is implemented using the Web Service interface. When Print Adapter 411 is called, it calls the printer object installed on the server beforehand and executes printing. If the printer supports direct printing, it can directly send the print data to the specified IP address. Printer object is an object registered on the OS and corresponds to one or more printer drivers. If a printer object is specified by Print Adapter 411 and data is provided for the object, the printer driver is called, the data passed to the printer object is converted to print data. Then, Print Adapter 411 sends the print data to printer 1001 or 1002, which corresponds to the printer object.

FAX Adapter 412 is an adapter that executes FAX transmission. It calls the FAX object installed on the server beforehand and executes FAX transmission. FAX object is an object registered on the OS and corresponds to one or more FAX drivers. If a FAX object is specified by FAX Adapter 412 and data and FAX number are provided for the FAX object, a FAX driver is called and data passed to the FAX object is converted to FAX transmission data. Then, FAX Adapter 412 sends the FAX transmission data to FAX 1003, which corresponds to the FAX driver. FAX 1003, which receives the data, sends the FAX transmission data to a FAX device, for example, FAX 1004, which corresponds to the said FAX number using public circuit 1007 as needed.

File Adapter 413 is an adapter that sends data, such as files, that was provided via the network using file transmission protocols such as SMB and FTP.

E-Mail Adapter 414 is an adapter that sends data, such as files, that was provided using protocols such as SMTP, by e-mail.

PDF Adapter 415 is an adapter that merges and splits PDF files that were provided. Also, it has the capability to attach a password to data that was provided or processed, to add text, and to add watermarks, among others.

Content Management Adapter 416 is an adapter that controls Content Management 403. It can retrieve specified files from Content Management 403 and store specified files on Content Management 403.

Authentication Management Adapter 417 is an adapter that controls Directory Service 402. It can request authentication for Directory Service 402.

File Format Conversion Adapter 418 is an adapter that converts file formats. It may have the capability to convert various formats with one another. Various formats include spreadsheets, document application formats, presentation formats, TIFF, JPG, bitmap, plain text, CIF, GIF, and PNG, among others.

GUI Application 421 is a GUI application. User can create GUI Application 421 arbitrarily. It has the capability to display and control the various GUIs of this embodiment. GUI Application 421 is managed and executed by Application Management 404.

BPEL Process Application 422 is an arbitrary BPEL Process that the user created. It is managed and executed by BPEL Engine 401.

Next, process overview in this embodiment will be described using FIGS. 5 and 6.

Figure 5:
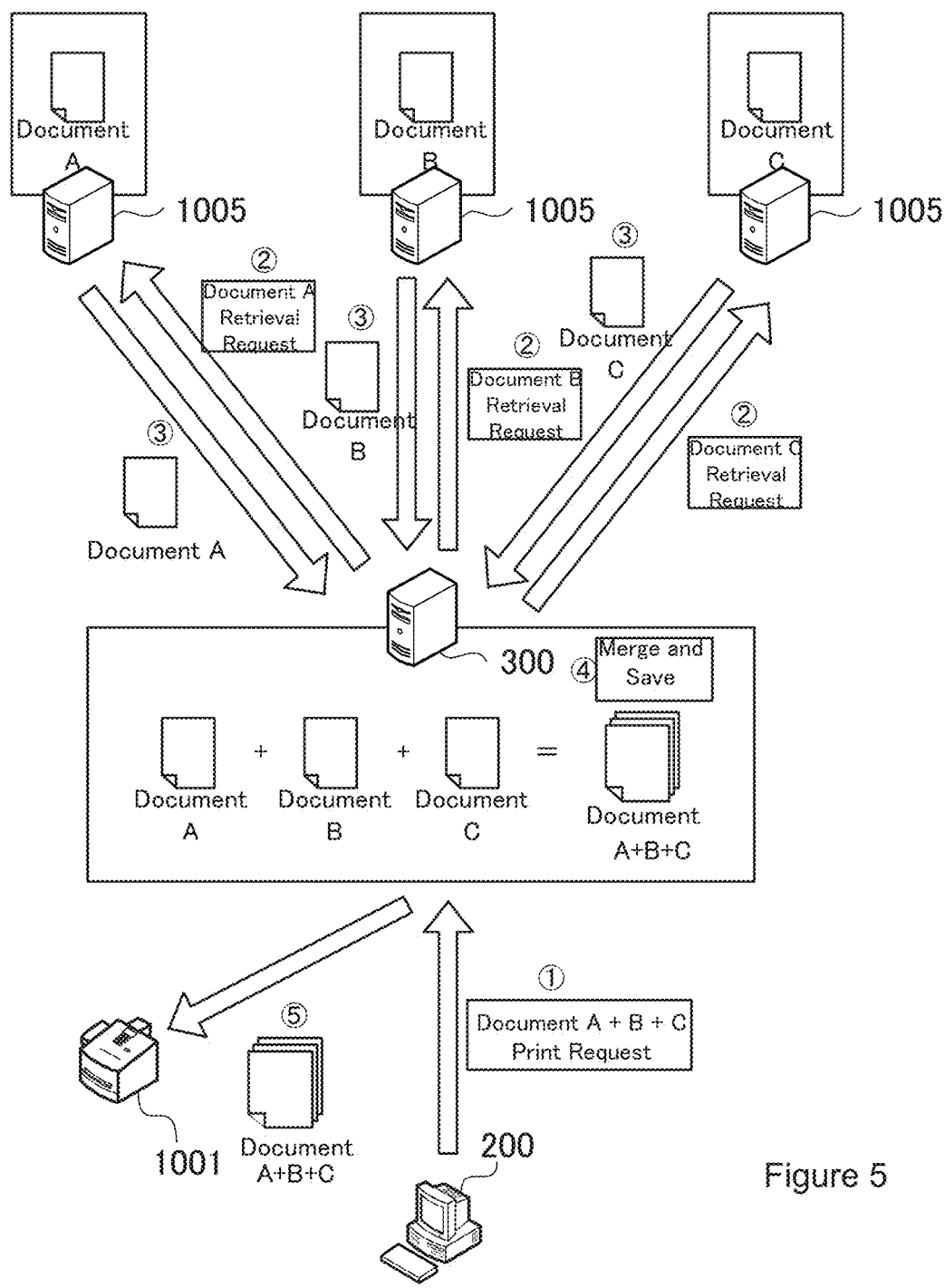
FIG. 5 illustrates a sample process overview of embodiment 1.

FIG. 5 illustrates a sample process overview based on the document merge request sent from Client PC 200.

First, CPU 201 on Client PC 200 (hereinafter, simply "Client PC 200") receives a print request for a merged document that comprises multiple documents stored in Document Server 1005 from the user via an input device. Client PC 200 sends a request to print "Document A+B+C," which is "Document A," "Document B," and "Document C" merged into one document, to Relay Server 300.

Once CPU 201 on Relay Server 300 (hereinafter, simply "Relay Server 300") receives the request to print "Document A+B+C" from Client PC 200, it identifies the storage destination of the requested document from the database retained by Relay Server 300. Since Relay Server 300 has such information as document name, server name, storage folder and such stored in the database, it can utilize such information to identify the document's save destination. Relay Server 300 sends a request to retrieve the said document to Document Server 1005, which is the save destination that was identified.

When CPU 201 on Document Server 1005 (hereinafter, simply "Document Server 1005") receives a document retrieval request from Relay Server 300, it retrieves the said document and returns it to Relay Server 300.

When Relay Server 300 receives all documents sent from Document Server 1005 according to the said document retrieval request, it merges all documents that it received into one document ("merged document") and stores it in a memory area (External Memory 211, for example). The process for Relay Server 300 creating the said merged document and saving it into a memory area is an example of Relay Server 300's storage process.

In the example illustrated in FIG. 5, Relay Server 300 sends a retrieval request for each "Document A," "Document B," and "Document C" to Document Server 1005, on which each document is saved. Then, once "Document A," "Document B," and "Document C" are all returned from Document 1005, Relay Server 300 merges them and generates "Document A+B+C." Relay Server 300 stores the generated "Document A+B+C" in the memory area of Relay Server 300, creates a print job, and sends it to Printer 1001. The process of Relay Server 300 retrieving the merged file to generate various jobs is an example of Relay Server 300's retrieval process. This applies to the following processes as well. By doing so, Relay Server 300 retrieves multiple documents from each Document Server 1005, creates a document that merges all the retrieved documents, and saves it to External Memory 211.

Figure 6:
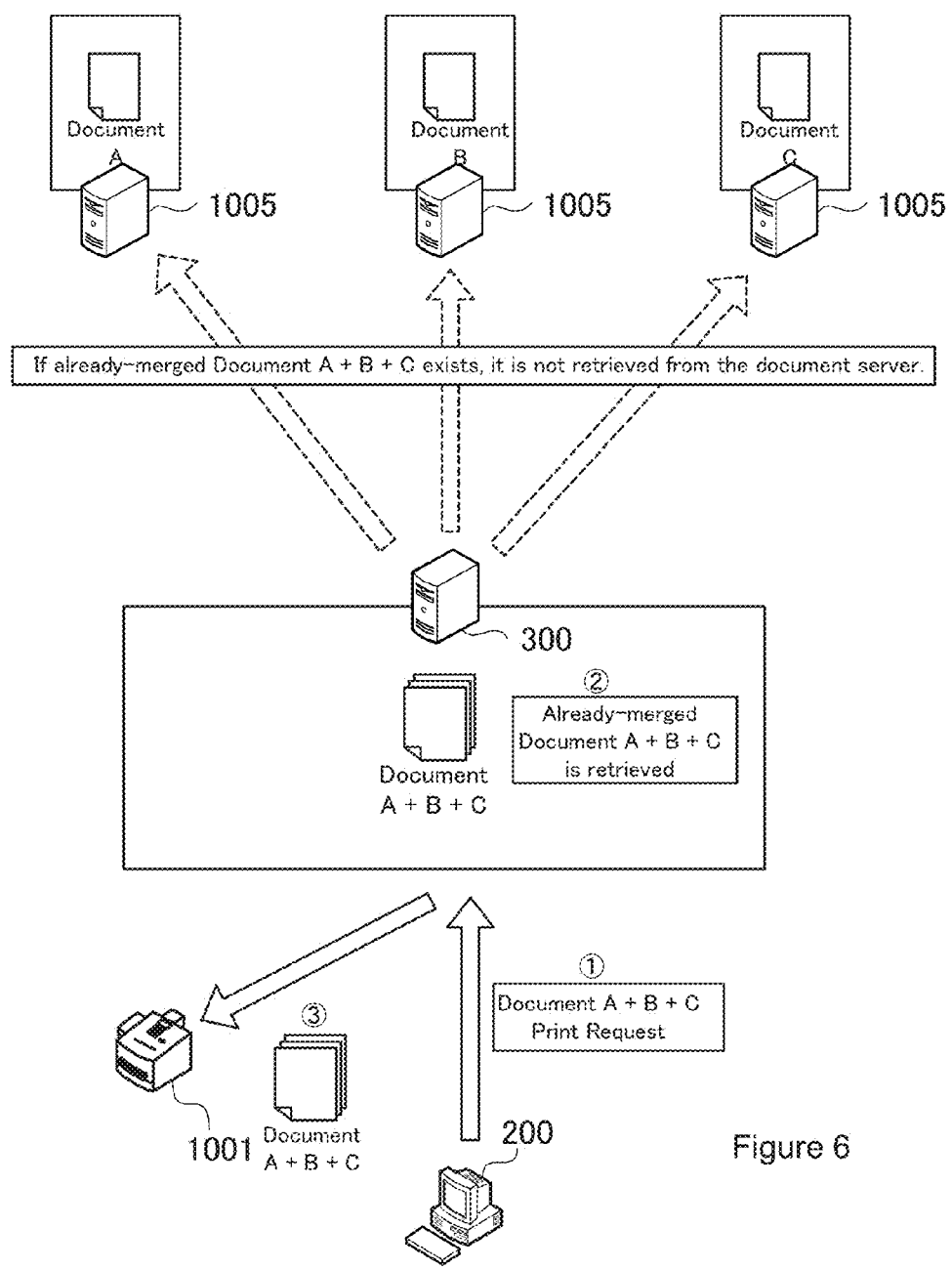
FIG. 6 illustrates a sample process overview of when the same merged document is requested again after the process described in FIG. 5.

FIG. 6 illustrates a process overview of when the same merged document is requested again from Client PC 200 after the process illustrated in FIG. 5 has been executed.

As in the case with FIG. 5, Client PC 200 receives a print request for a merged document that comprises multiple documents stored in Document Server 1005 from the user via an input device. It is assumed here that Client PC 200 received a print request for "Document A+B+C."

When Relay Server 300 receives the request from Client PC 200, it determines whether the merged document exists in Relay Server 300's memory area. The process of Relay Server 300 determining whether the said merged document exists or not in its memory area is an example of Relay Server 300's determination process. In the example illustrated in FIG. 6, since Relay Server 300 already created "Document A+B+C" and saved it in its memory area in FIG. 5, it sends the saved "Document A+B+C" to Printer 1001 without retrieving the document anew from Document Server 1005.

As stated above, processing load on Relay Server 300 is reduced, for Relay Server 300 does not need to re-merge the documents. This mechanism will be described below.

Figure 7:
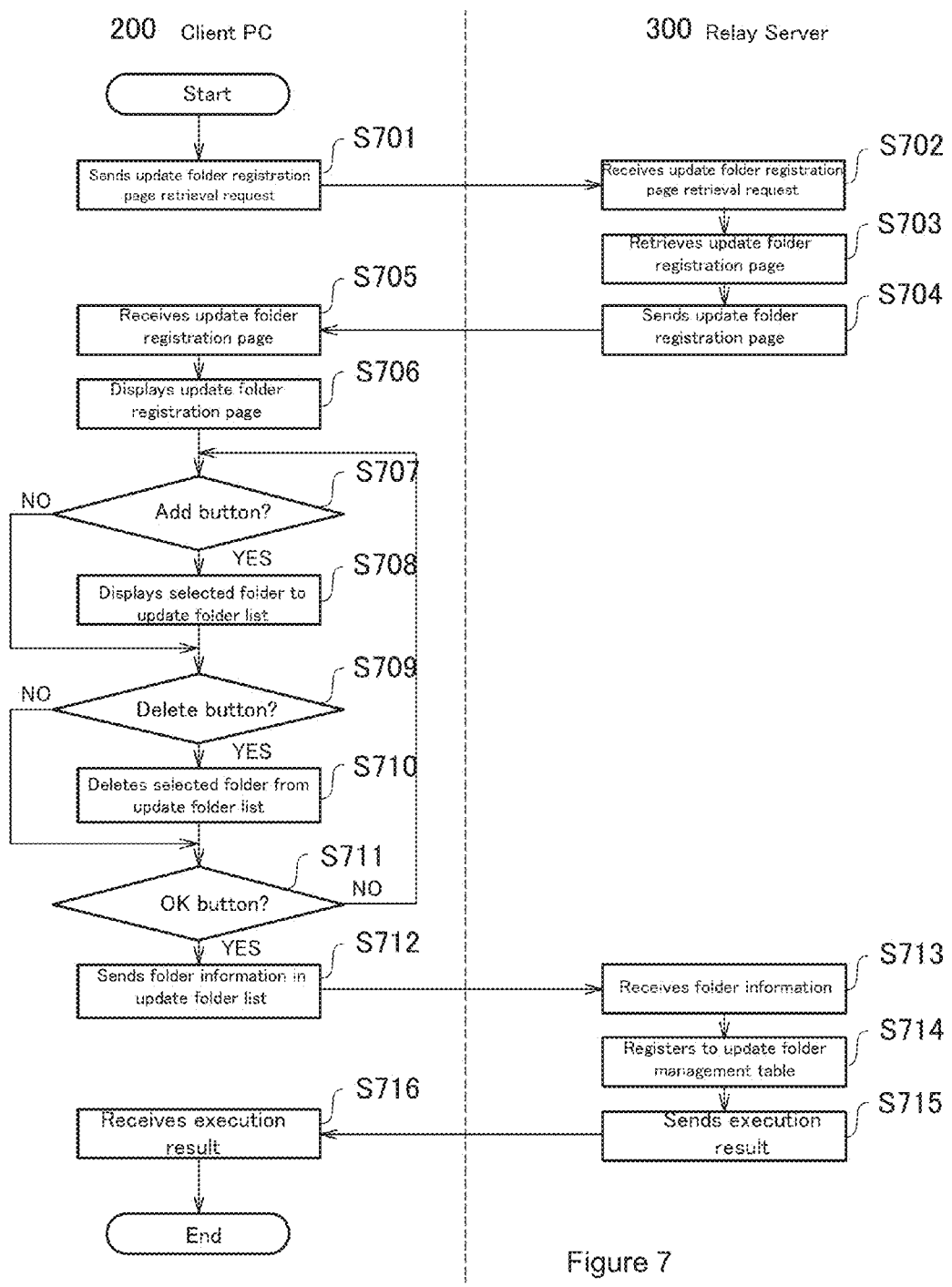
FIG. 7 illustrates a flowchart that describes a sample process regarding updated folder registration in embodiment 1.

FIG. 7 is a flowchart that illustrates a sample process that Client PC 200 and Relay Server 300 executes in order to register a folder that contains a document that may be updated among all the folders that are located on Document Server 1005.

In this embodiment, the documents that constitute the merged document saved by Relay Server 300 may be updated on Document Server 1005. More specifically, there may be times when the folders in which the said documents are contained may be shared with other users or when updates frequently occur due to the nature of the documents. Registering such folders as update folders beforehand, based on the process illustrated in FIG. 7, helps Client PC 200 and Relay Server 300 with the merge process, which will be described later. Documents that may be updated are an example of an update file.

At S701, Client PC 200 sends a request to retrieve the update folder registration page to Relay Server 300. Update folder is a folder shared by multiple users or in which documents are frequently updated, as was described earlier.

At 702, Relay Server 300 receives the request to retrieve the update folder registration page from PC 200.

At S703, Relay Server 300 retrieves the update folder registration page saved in Relay Server 300's memory area.

At 704, Relay Server 300 sends the update folder registration page, retrieved at S703, to Client PC 200.

At 705, Client PC 200 receives the update folder registration page sent from Relay Server 300.

Figure 8:
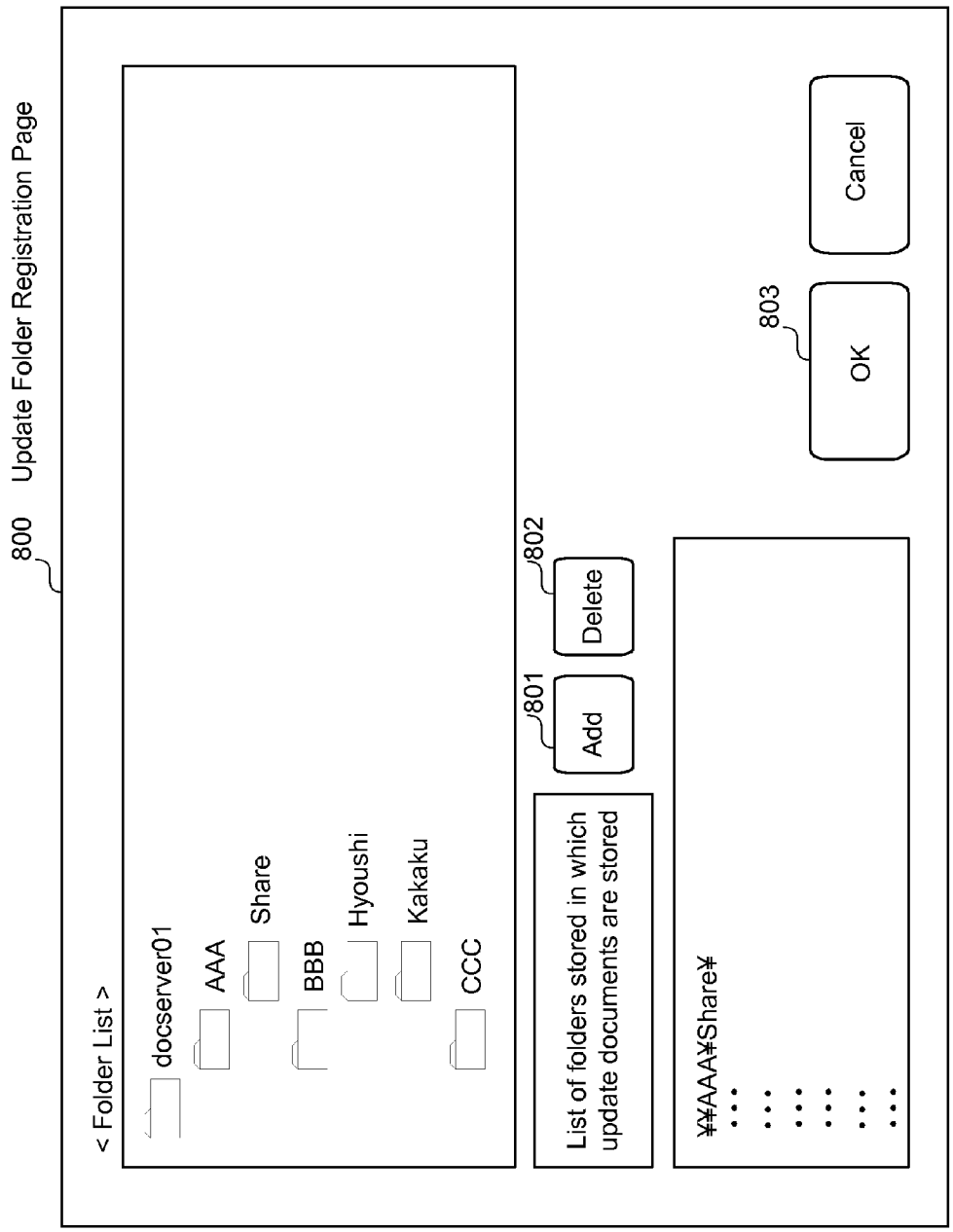
FIG. 8 illustrates a sample updated folder registration page.

At 706, Client PC 200 displays the Update Folder Registration Page 800 received at S705 and accepts user operation via the input device. Update folder registration page 800 is a page similar to what is illustrated in FIG. 8. It is a page on which update folders are registered.

FIG. 8 illustrates a sample update folder registration page.

On Update Folder Registration Page 800 illustrated in FIG. 8, the folder hierarchy of Client PC 200 (or Document Server 1005) is displayed on the top of the page. If already-registered update folders exist, they are displayed in the list on the bottom of the page. The area will remain empty if nothing has been registered.

At 707, Client PC 200 determines whether an update folder was selected and "add" button 801 on Update Folder Registration Page 800 was pressed based on user operation via an input device. If Client PC 200 determines that "add" button 801 was pressed, it proceeds to S708. Otherwise (for example, when a button other than the "add" button 801 was pressed), it proceeds to S709.

At S708, Client PC 200 displays the folder selected by user operation via an input device on the list of update folders on the bottom of the page. Thus, Client PC 200 completes the preparation for registering the update folder.

At S709, Client PC 200 determines whether an update folder was selected and "delete" button 802 on Update Folder Registration Page 800 was pressed based on user operation via an input device. If Client PC 200 determines that "delete" button 802 was pressed, it proceeds to S710. Otherwise (for example, when a button other than the "delete" button 802 was pressed), it proceeds to S711.

At S710, Client PC 200 deletes the update folder selected from the update folder list based on user operation via an input device from the said list. That is, Client PC 200 registers the folder as a regular folder and not an update folder. Client PC 200 registers and releases update folders by adding and deleting them at S708 and S710, respectively.

At S711, Client PC 200 determines whether the "OK" Button 803 on Update Folder Registration Page 800 was pressed or not when update folders are registered based on user operation via an input device. If Client PC 200 determines that "OK" Button 803 was pressed, it proceeds to S712. Otherwise (for example, when a button other than the "OK" Button 803 was pressed), it returns to S707.

At S712, Client PC 200 sends the information of the update folder added at S708 to Relay Server 300. Information of the added update folder includes the server name of Document Server 1005, on which the added update folder is located, and folder path of the update folder.

At S713, Relay Server 300 receives the information of the update folder sent from Client PC 200.

At S714, Relay Server 300 registers the update folder information received at S713 in Update Folder Management Table 900 illustrated in FIG. 9A.

FIG. 9A illustrates a sample update folder management table.

Update Folder Management Table 900 includes Folder ID 901, Document Server Name 902, and Folder Path 903. Folder ID 901 is a unique ID assigned to each update folder. Document Server Name 902 indicates the name of Document Server 1005 on which the update folder is located. Folder Path 903 indicates the folder path of the update folder on Document Server 1005. Update Folder Management Table 900 is an example of update folder information.

When Relay Server 300 registers an update folder, it issues a new Folder ID 901, stores Document Server Name 902 to which the folder belongs, and stores Folder Path 903 of the said folder. Relay Server 300 may specify which folder belongs to which Document Server 1005 based on data that associates Document Server 1005 with folders stored separately in a database. In addition, Relay Server 300 may specify which folder belongs to which Document Server 1005 using another method.

At S715, Relay Server 300 sends the result of update folder registration to Client PC 200.

At S716, Client PC 200 receives the result and completes the series of processes. In this way, Client PC 200 and Relay Server 300 register the update folders ahead of time.

Figure 10A:
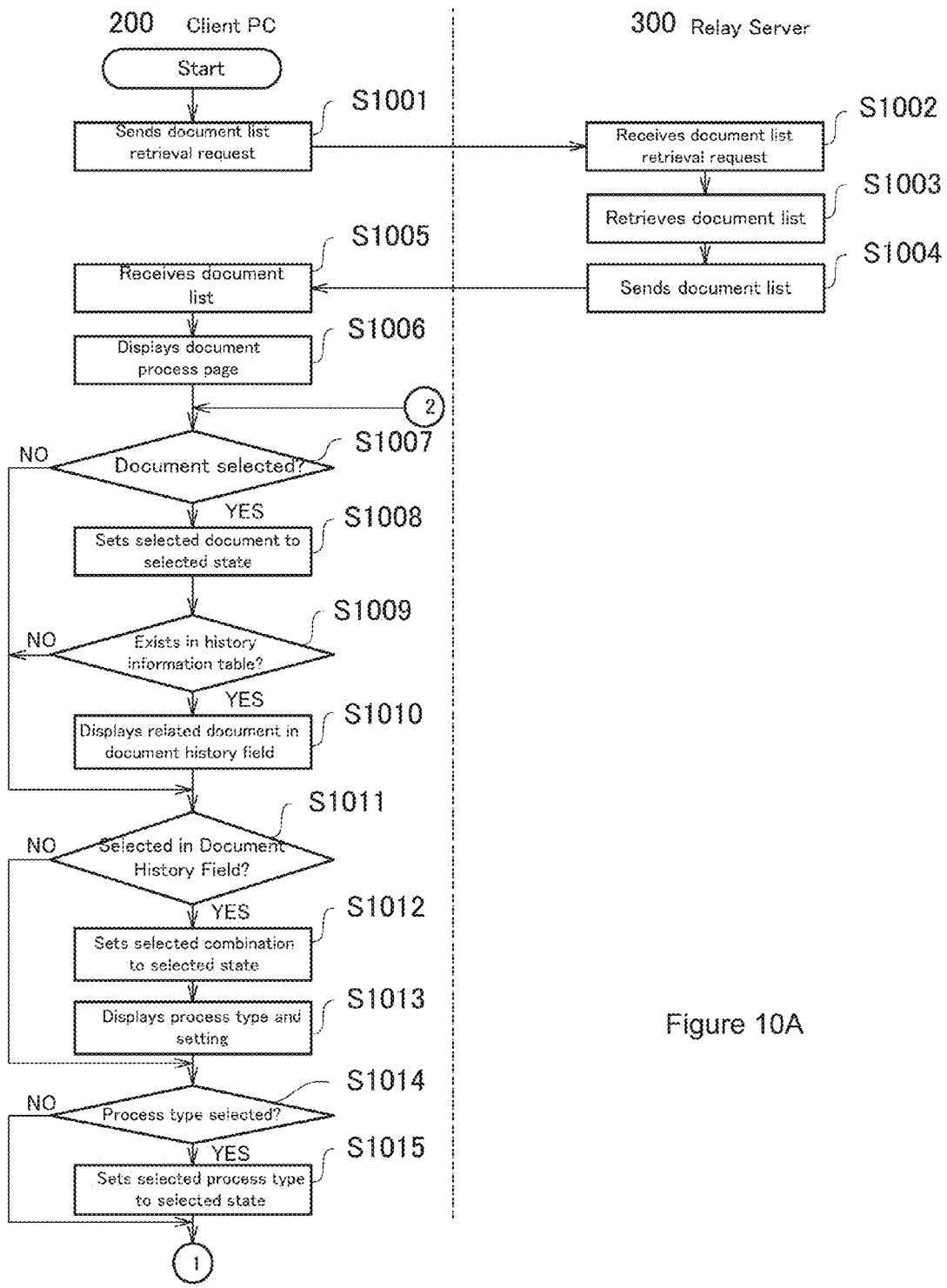
FIG. 10A illustrates a flowchart that describes a sample process (from S1001 to S1015) between the client PC and relay server in embodiment 1.
Figure 10B:
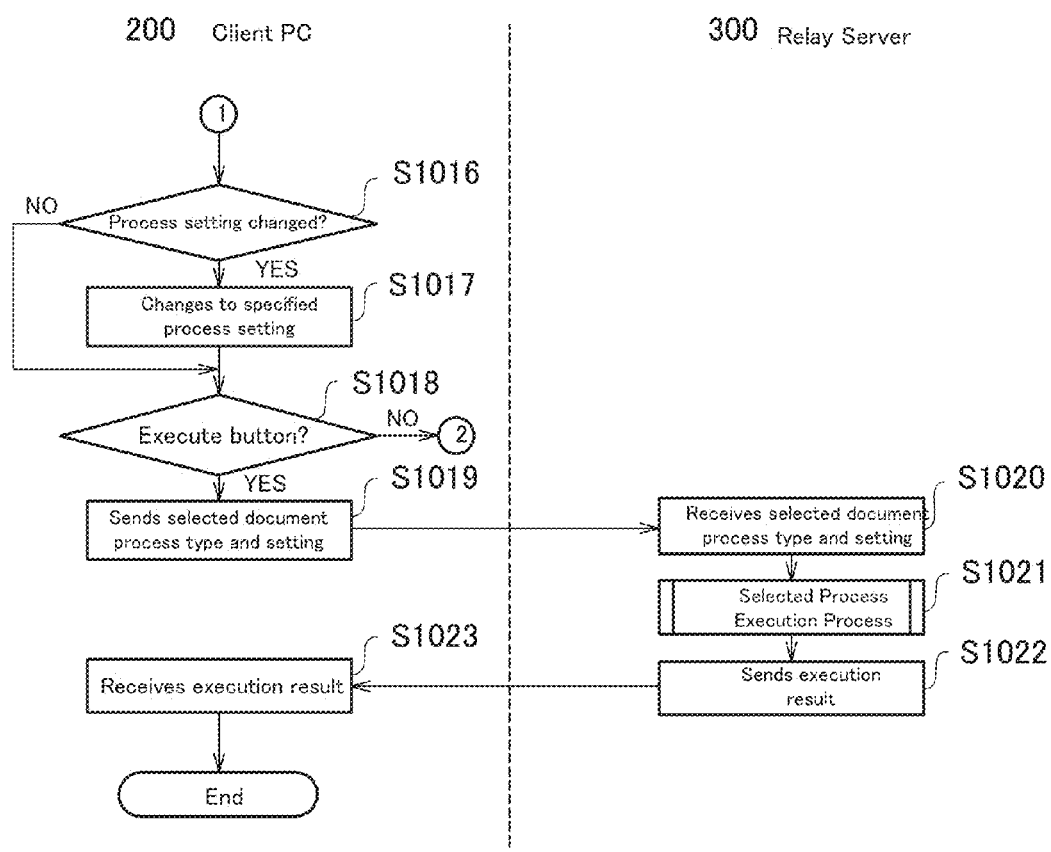
FIG. 10B illustrates a flowchart that describes a sample process (from S1016 to S1023) between the client PC and relay server in embodiment 1.

FIGS. 10A and 10B are flowcharts that describe a sample process of Client PC 200 requesting Relay Server 300 to retrieve multiple documents and to merge them. FIG. 10A is a flowchart that describes steps S1001 through S1015. FIG. 10B is a flowchart that describes steps S1016 through S1023.

At S1001, Client PC 200 sends a request to retrieve a list of document names stored on Document Server 1005 (hereinafter "document list") to Relay Server 300.

At S1002, Relay Server 300 receives a request from Client PC 200 to retrieve a document list.

At S1003, Relay Server 300 retrieves Document Name 912 from Document Management Table 910 illustrated in FIG. 9B.

FIG. 9B illustrates a sample document management table.

Document Management Table 910 is a list of information related to documents, which Relay Server 300 collect by sending regular inquiries to Document Server 1005. Document ID 911 is a unique ID assigned to each document. Document Name 912 is the name of the said document. Document Server Name 913 is the name of Document Server 1005 on which the said document is saved. Folder Path 914 is the folder path to the location where the said document is saved.

At S1004, Relay Server 300 sends the document list that comprises Document Name 912 to Client PC 200.

At S1005, Client PC 200 receives the document list sent from Relay Server 300.

Figure 11:
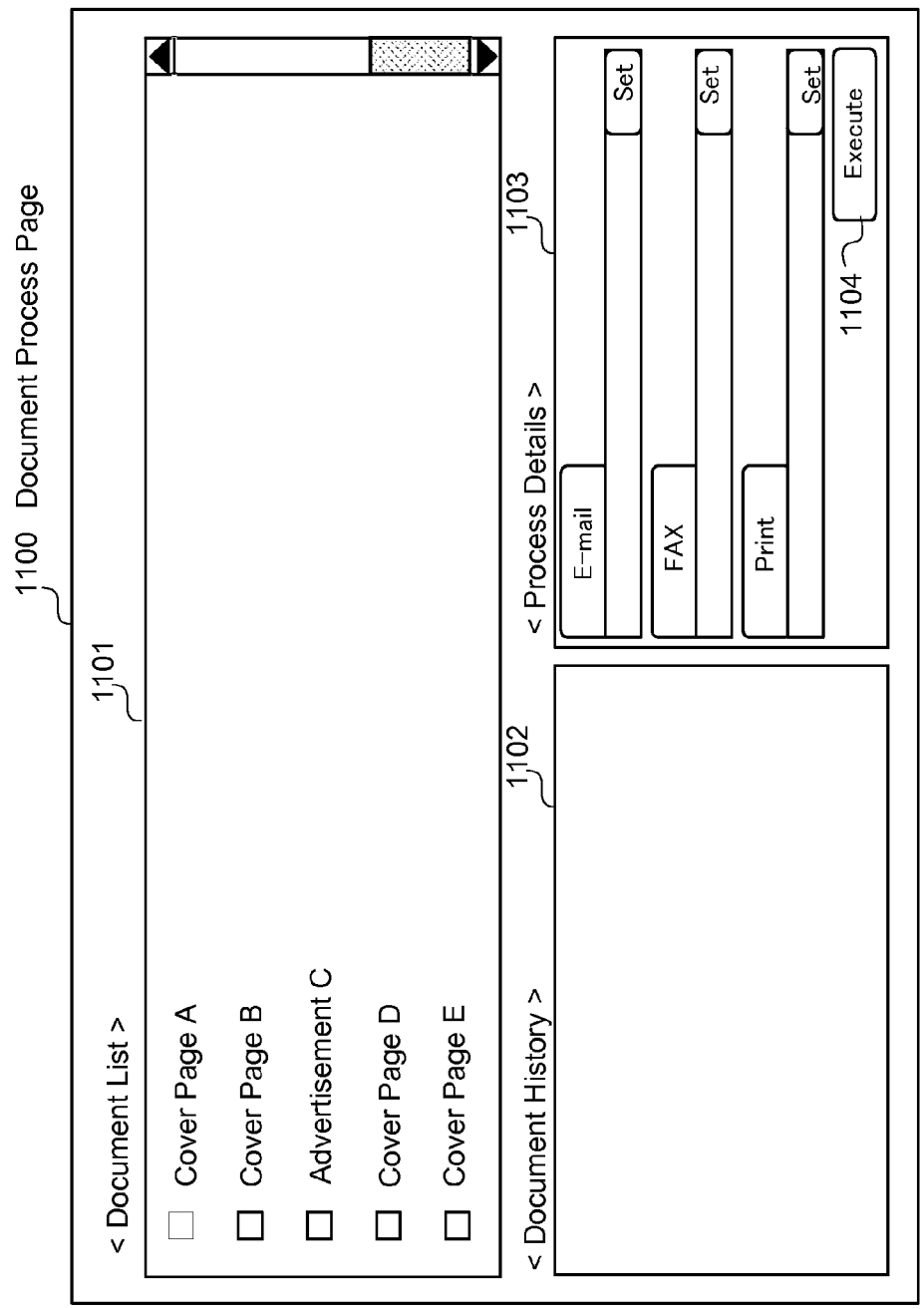
FIG. 11 illustrates a sample document process page.

At S1006, Client PC 200 generates and displays Document Process Page 1100 as illustrated in FIG. 11 based on the list of documents received at S1005 and accepts user operation via an input device.

FIG. 11 illustrates a sample document process page.

Document Process Page 1100 accepts user operation via an input device to select multiple documents and instruct an arbitrary process to be executed. User selects multiple documents from Document List 1101 displayed on the top of Document Process Page 1100 via an input device and selects a process that he wishes to execute from the list of processes displayed on the bottom right of the page. By doing so, Client PC 200 can merge multiple documents based on user operation received via an input device and instruct the arbitrary process on the said merged document to be executed.

At S1007, Client PC 200 determines whether a document was selected on Document Process Page 1100 by user operation via an input device. More specifically, Client PC 200 determines whether a selection was made on a check box of a document in the area where Document List 1101 is displayed on the top of Document Process Page 1100. If Client PC 200 determines that a document was selected, it proceeds to S1008. Otherwise (for example, when a combination of documents that constitute the merged document was selected in Document History Field 1102 or when a process type was selected in Process Details 1103), it proceeds to S1011.

At S1008, Client PC 200 sets the state of the selected document's check box to a checked state.

At S1009, Client PC 200 determines whether the selected document is a previously merged document. More specifically, Client PC 200 determines whether the selected document is contained in History Information Table 1200, which is illustrated in FIG. 12 and stored on Relay Server 300. If Client PC 200 determines that a document that was previously merged has been selected, it proceeds to S1010. Otherwise, it proceeds to S1011.

FIG. 12 illustrates a sample history information table.

History Information Table 1200 illustrated in FIG. 12 illustrates that history of merged documents is stored for each user. Merged Document 1203 through 1205 indicate Document Name 912 of the documents that constitute the merged document. Process Type 1206 indicates the type of process performed on the merged document. Process Setting 1207 indicates a detailed setting of Process Type 1206. Update Folder Document 1208 indicates Document Name 912 of the document from Merged Document 1203 through 1205 that is saved in the update folder. Date/Time Last Used 1209 indicates the date and time the merged document was last used. History Information Table 1200 is updated each time a merged document is saved using a process that will be described later. In this embodiment, an embodiment in which 3 documents from Merged Document 1203 through 1205 are merged. However, the number does not need to be limited to 3.

Figure 13:
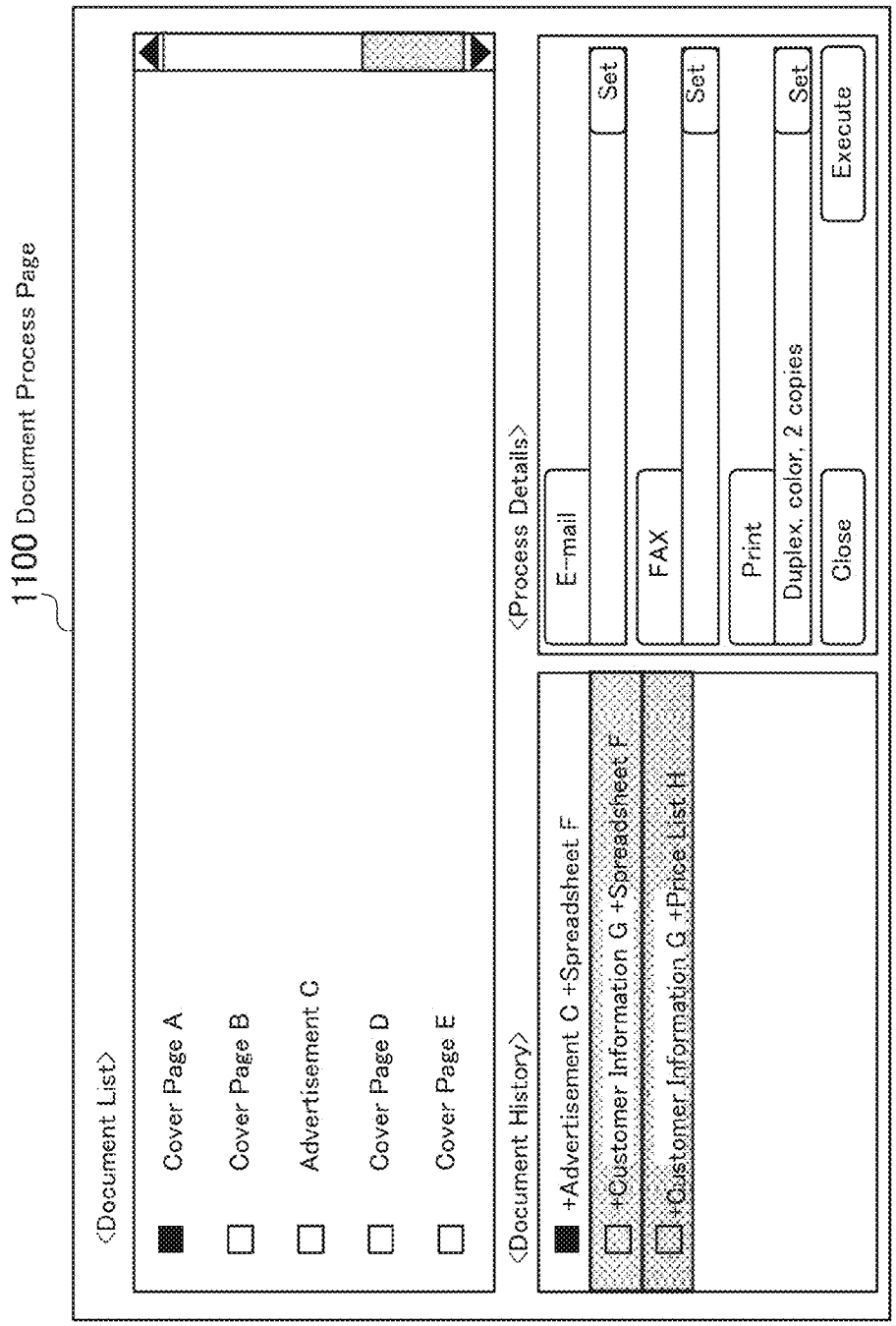
FIG. 13 illustrates a sample document process page including input information.

At S1010, Client PC 200 displays the combination of documents including the selected document in Document History Field 1102 displayed at the bottom left of Document Process Page 1100. More specifically, Client PC 200 specifies the record in History Information Table 1200 that has the same User ID 1202 as the user that operates Client PC 200. Client PC 200 then specifies the record that contains the same document as the selected document from Merged Document 1203 through 1205. Client PC 200 retrieves Merged Document 1203 through 1205 and displays the combination of documents (hereinafter "Combination History") in Document History Field 1102. FIG. 13 illustrates a sample result displayed by Client PC 200.

FIG. 13 illustrates a sample Document Process Page display.

For example, if "User A" selects a document "Cover Page A," Client PC 200 refers to History Information Table 1200 illustrated in FIG. 12 and identifies that "User A" created 3 merged documents including "Cover Page A." More specifically, the said 3 merged documents are "Cover Page A+Advertisement C+Spreadsheet F," "Cover Page A+Customer Information G+Spreadsheet F," and "Cover Page A+Customer Information G+Price List H." Thus, Client PC 200 displays the history of these three combinations in Document History Field 1102 of Document Process Page 1100 so that they become selectable. For example, Client PC 200 may display check boxes next to the combination history so that they can be selected.

At S1011, Client PC 200 determines whether the combination history displayed in Document History Field 1102 at S1010 was selected by user operation via an input device. More specifically, Client PC 200 determines whether a combination history check box displayed in Document History Field 1102 was selected. If Client PC 200 determines that a combination history check box was selected, it proceeds to S1012. Otherwise (for example, when a process type was selected in Process Details 1103 or when a process type setting was changed), it proceeds to S1014.

At S1012, Client PC 200 sets the state of the selected combination history's check box to a checked state.

At S1013, Client PC 200 retrieves Process Type 1206 of the combination history selected at S1012 and Process Setting 1207 from History Information Table 1200. And Client PC 200 displays the said Process Type 1206 and said Process Setting 1207 it retrieved in Process Details 1103 at the bottom right of Document Process Page 1100. History Information Table 1200 contains Process Type 1206 and Process Setting 1207. Therefore, Client PC 200 can set previous process details in Process Details 1103. For example, for "Cover Page A+Advertisement C+Spreadsheet F," you can see that Client PC 200 previously issued a "print" instruction with "duplex, color, 2 copies." Client PC 200 sets Process Type 1206 and Process Setting 1207 in Process Details 1103 of Document Process Page 1100. Document Process Page 1100 set by Client PC 200 will be displayed as illustrated in FIG. 13.

At S1014, Client PC 200 determines whether a process type was selected in Process Details 1103 on Document Process Page 1100 by user operation via an input device. Client PC 200 may accept the process type selection by installing a button or a radio button. If Client PC 200 determines that a process type was selected, it proceeds to S1015. Otherwise (for example, if a process type setting has changed or when Execute Button 1104 was pressed), it proceeds to S1016 in FIG. 10B.

At S1015, Client PC 200 sets the state of the process type selected by user operation via an input device to a selected state.

FIG. 10B will be described in this section.

At S1016, Client PC 200 determines whether the process type setting was changed by user operation via an input device. More specifically, since there are settings for each process type, Client PC 200 determines whether instructions to change the settings were received from the user via an input device. If Client PC 200 determines that the process setting was changed, it proceeds to S1017. Otherwise (for example, if Execute Button 1104 was pressed), it proceeds to S1018.

At S1017, Client PC 200 changes the setting based on the user instruction accepted via an input device. If no setting has been configured, Client PC 200 configures a new setting. If a setting has already been configured, Client PC changes the setting.

At S1018, Client PC 200 determines whether Execute Button 1104 on Document Process Page 1100 was pressed or not by user operation via an input device. Client PC 200 accepts Execute Button 1104 to be pressed when a document has been selected in Document List 1101 or Document History Field 1102 and a process has been selected in Process Details 1103. Then, Client PC 200 executes the selected process on the document selected at S1021, which will be described later. If Client PC 200 determines that Execute Button 1104 was pressed, it proceeds to S1019. Otherwise, it returns to S1007 in FIG. 10A.

At S1019, Client PC 200 sends the document name, process type, and process setting of the document (including merged document) selected by user operation via an input device to Relay Server 300. If the document was selected in Document History Field 1102, Client PC 200 sends the information that the document was selected in Document History Field 1102 to Relay Server 300 as well.

At S1020, Relay Server 300 receives the information sent from Client PC 200.

At S1021, Relay Server 300 executes the selected process on the selected documents based on the information. Details of the process at S1021 will be described later using FIGS. 14A and 14B.

At S1022, Relay Server 300 sends the process execution results to Client PC 200.

At S1023, Client PC 200 receives the process execution results and ends the process.

Figure 14A:
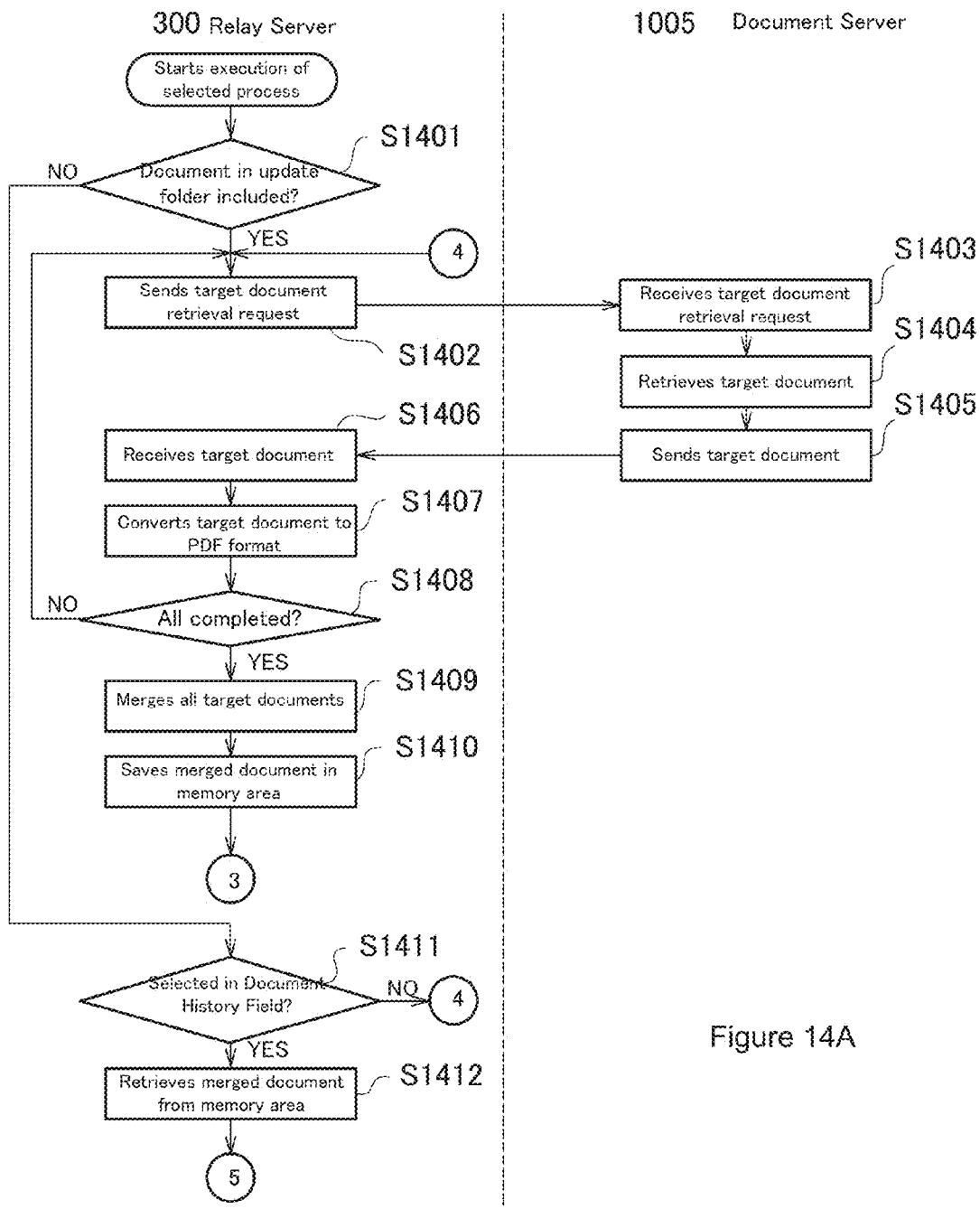
FIG. 14A illustrates a flowchart that describes a sample process (from S1401 to S1412) between the relay server and document server in embodiment 1.
Figure 14B:
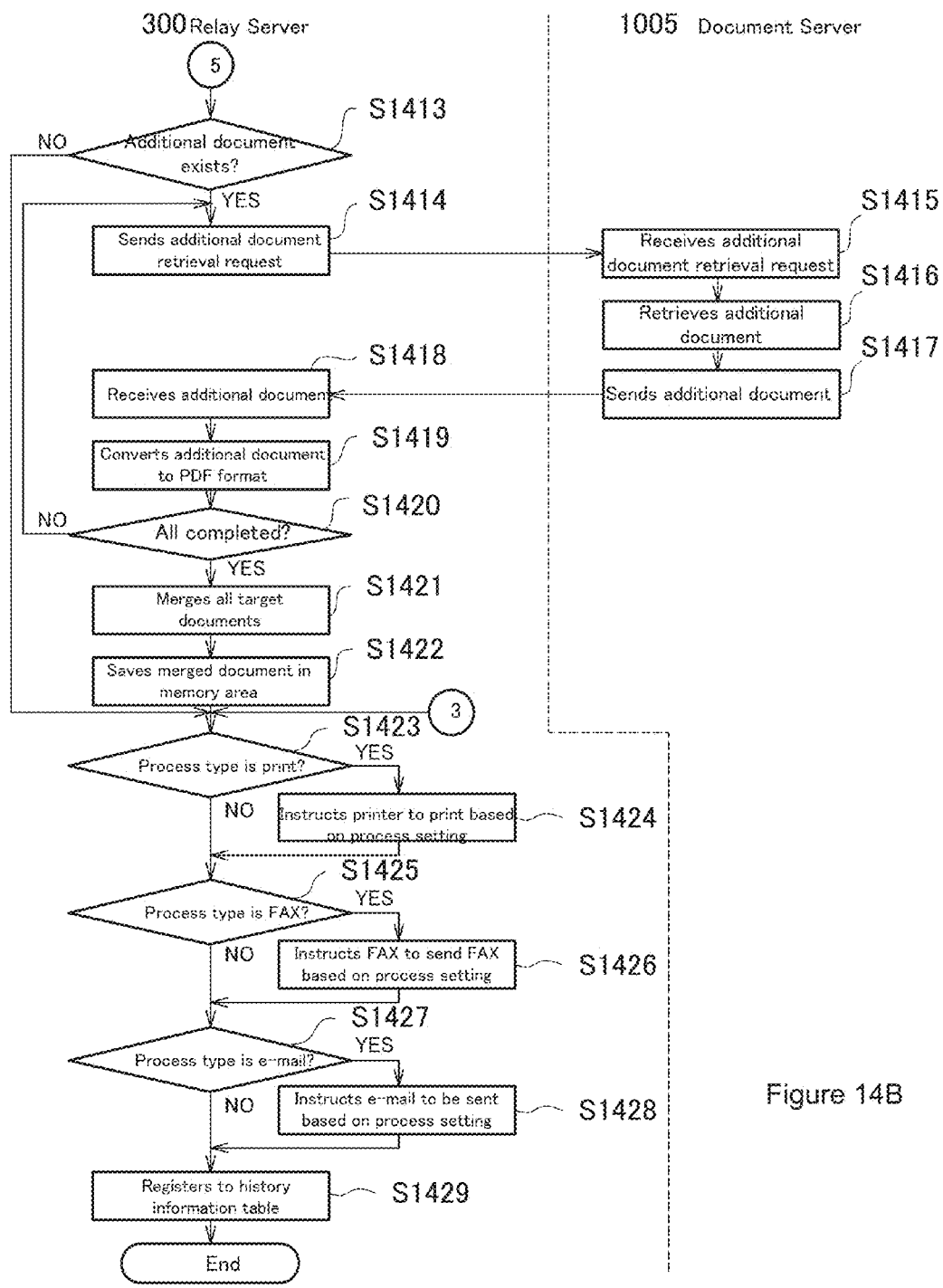
FIG. 14B illustrates a flowchart that describes a sample process (from S1413 to S1429) between the relay server and document server in embodiment 1.

FIGS. 14A and 14B are flowcharts that describe a sample process of Relay Server 300 retrieving the documents from Document Server 1005 and executing the specified process based on the request from Client PC 200. FIG. 14A is a flowchart that describes steps S1401 through S1412. FIG. 14B is a flowchart that describes steps S1413 through S1429.

At S1401, Relay Server 300 determines whether the documents instructed to be merged by Client PC 200 are documents that are stored in the update folder. More specifically, Relay Server 300 determines whether the combination of the selected document's Document Server Name 913 and Folder Path 914 is registered in Update Folder Management Table 900. Process at S1401 is an example of Relay Server 300's update file decision process.

Relay Server 300 determines whether the documents included in the selected combination history are documents saved in the update folder, even if the documents were selected in Document History Field 1102. That is, Relay Server 300 retrieves the document again from Document Server 1005 if a document saved in the update folder is included in the said merged document, even if the document is a merged document. Relay Server 300 then merges the retrieved documents. By doing so, Relay Server 300 can retrieve the latest document even if the document may be updated. If Relay Server 300 determines that the document includes a document stored in the update folder, it proceeds to S1402. Otherwise, it proceeds to S1411.

At S1402, Relay Server 200 sends a request to retrieve the documents to be merged that were selected by user operation via an input device (hereinafter "target document") to Document Server 1005, which is where the said documents are saved. Said retrieval request contains at least the document name of the target document. Save destination of target documents varies by document. Relay Server 300 refers to Document Management Table 910 and sends a request to the target Document Server 1005 to retrieve the target document.

At 1403, Document Server 1005 receives the request to retrieve the target document from Relay Server 300.

At 1404, Document Server 1005 retrieves the target document based on the retrieval request received at S1403. Said retrieval request contains the document name of the target document. Document Server 1005 retrieves the target document based on that from its memory area.

At S1405, Document Server 1005 sends the target document retrieved at S1404 to Relay Server 300.

At S1406, Relay Server 300 receives the target document sent from Document Server 1005.

At S1407, Relay Server 300 uses File Format Conversion Adapter 418 to convert the target document received at S1406 to PDF format. Documents come in different file formats, and Relay Server 300 cannot merge documents in various formats in the said various formats. For example, a Word document and an Excel document have different file structures. As a result, Relay Server 300 cannot merge them as-is. Therefore, Relay Server 300 uniformly converts every document to a format that it can merge before merging them and creating one merged data, regardless of the original data format. In this embodiment, the merged format of choice is PDF. However, it may be a different format. For example, it may be an image data format such as TIFF, or it may be HTML. As long as Relay Server 300 can merge data with different formats, they can be converted to any format.

At S1408, Relay Server 300 determines whether all target documents selected by user operation via an input device have been received from Document Server 1005. If Relay Server 300 determines that all said target documents have been received, it proceeds to S1409. Otherwise, it returns to S1402.

At S1409, Relay Server 300 uses PDF Adapter 415 to merge all target documents converted to PDF at S1407 and creates one document (merged document). Relay Server 300 changes the name of the modified document to a name that merges the names of the documents that are merged so as to make it easier to identify which documents the merged document comprises. For example, if Relay Server 300 merged "Document A," "Document B," and "Document C," the merged document name may be, but not limited to "Document A+B+C."

At S1410, Relay Server 300 saves the merged document to the specified memory area of Relay Server 300 such as External Memory 211, and it proceeds to S1423 in FIG. 14B. Process from S1402 through S1410 is an example of Relay Server 300's creation process.

At S1411, Relay Server 300 determines whether the target document instructed to be merged is the document selected in Document History Field 1102 on Document Process Page 1100. If Relay Server 300 determines that the document was selected in Document History Field 1102, it proceeds to S1412. Otherwise (for example, if it was determined that the document was selected in Document List 1101), it proceeds to S1402.

If said target document was selected in Document History Field 1102, it should already be saved in Relay Server 300's External Memory 211 or some other memory area. Therefore, if Relay Server 300 retrieves the merged document that has been saved, it does not need to execute the merge process again. On the other hand, if the document was selected from Document List 1101, Relay Server 300 re-merges the target document even if the document has the same combination as the merged document that has been saved.

As previously described, at S1019, Client PC 200 may send the information that the document was selected in Document History Field 1102 when it sends a variety of information to Relay Server 300. By doing so, Relay Server 300 will be able to determine whether the said target document that was instructed to be merged is a document selected in Document History Field 1102.

In another embodiment, Relay Server 300 may determine whether the combination of the target document exists in History Information Table 1200, and if it does exist, it may retrieve the merged document that has already been merged. As long as it can be determined whether the merged document exists, the method does not matter.

At S1412, Relay Server 300 retrieves the merged document selected in Document History Field 1102 from Relay Server 300's memory area. Since the merged document has a name that indicates the documents that were merged, Relay Server 300 uses the said document name to extract and retrieve the required merged document from the memory area.

Next, FIG. 14B will be described.

At S1413, Relay Server 300 determines whether an additional document has been selected from Document List 1101 in addition to Document History Field 1102. That is, Relay Server 300 determines whether the document that is already merged has a document that is supposed to be added to it (hereinafter, "additional document") selected. If Relay Server 300 determines that the selection to add a document was made from Document List 1101, it proceeds to S1414. Otherwise, it proceeds to S1423. Additional document is an example of an additional file.

At S1414, Relay Server 300 sends a request to retrieve the additional document to Document Server 1005 on which the said document is saved. At least the document name of the additional document is included in the retrieval request. Save destination of additional documents varies by document. Relay Server 300 refers to Document Management Table 910 and sends a request to the target Document Server 1005 to retrieve the additional document.

At S1415, Document Server 1005 receives the request to retrieve the additional document from Relay Server 300.

At S1416, Document Server 1005 retrieves the additional document based on the retrieval request received at S1415. Said retrieval request includes the document name of the additional document. Document Server 1005 retrieves the target document from its memory area.

At S1417, Document Server 1005 sends the additional document that was retrieved at S1416 to Relay Server 300.

At S1418, Relay Server 300 receives the additional document that was sent from Document Server 1005.

At S1419, Relay Server 300 uses File Format Conversion Adapter 418 to convert the additional document received at S1418 to PDF format. Since the details of data formats are as described before, detailed description will be omitted here.

At S1420, Relay Server 300 determines whether all additional documents that were selected by user operation via an input device have been received from Document Server 1005. If Relay Server 300 determines that all said additional document have been received, it proceeds to S1421. Otherwise, it returns to S1414.

At S1421, Relay Server 300 uses PDF Adapter 415 to merge all additional documents converted to PDF format at S1419 and the merged document retrieved at S1412 into one document. Since the details of merged document names are as described before, they will be omitted here.

At S1422, Relay Server 300 saves the document merged at S1421 to Relay Server 300's External Memory 211 or some other memory area, and it proceeds to S1423.

What is described above is the process related to merging documents. S1423 through S1427 execute processes selected by the user.

At S1423, Relay Server 300 determines whether the process selected in Process Details 1103 is "print." More specifically, since Relay Server 300 received the process type at S1020 described above, it uses this information to determine whether the process selected in Process Details 1103 is "print." If Relay Server 300 determines that the process is "print," it proceeds to S1424. Otherwise (for example, the process selected in Process Details 1103 was FAX or e-mail), it proceeds to S1425.

At S1424, Relay Server 300 uses Print Adapter 411 to generate a print job based on the process setting configured in Process Details 1103 from the merged document saved at S1410, S1412, and S1422. Relay Server 300 then sends the print job to Printer 1001, Printer 1002 and others. Relay Server 300 uses the process setting received at S1020.

Printer 1001, Printer 1002 and such start printing on paper. In this embodiment, Relay Server 300 sends print jobs directly to printers. If a print server on which print jobs queue up exists, it may send print jobs to printers via the print server.

At S1425, Relay Server 300 determines whether the process selected in Process Details 1103 is "FAX." More specifically, since Relay Server 300 received the process type at S1020 described above, it uses this information to determine whether the process selected in Process Details 1103 is "FAX." If Relay Server 300 determines that the process is "FAX," it proceeds to S1426. Otherwise (for example, the process selected in Process Details 1103 was e-mail or print), it proceeds to S1427.

At S1426, Relay Server 300 uses FAX Adapter 412 to generate FAX data based on the process setting configured in Process Details 1103 from the merged document saved at S1410, S1412, and S1422. Relay Server 300 then sends the FAX data to FAX 1003, FAX 1004, and others. Relay Server 300 uses the process setting received at S1020. In this embodiment, Relay Server 300 sends the FAX data directly to FAX machines. If a FAX server on which FAX data is accumulated exists, it may send the FAX data to FAX machines via the FAX server.

At S1427, Relay Server 300 determines whether the process selected in Process Details 1103 is "e-mail." More specifically, since Relay Server 300 received the process type at S1020 described above, it uses this information to determine whether the process selected in Process Details 1103 is "e-mail." If Relay Server 300 determines that the process is "e-mail," it proceeds to S1428. Otherwise (for example, the process selected in Process Details 1103 was print or FAX), it proceeds to S1429.

At S1428, Relay Server 300 uses E-mail Adapter 414 to generate an e-mail based on the process setting configured in Process Details 1103 from the merged document saved at S1410, S1412, and S1422. More specifically, it generates an e-mail with the merged document attached based on the process setting. Relay Server 300 then sends the said e-mail to the mail server. Relay Server 300 uses the process setting received at S1020 for that.

At S1429, Relay Server 300 registers the information related to the processed merged document to History Information Table 1200. Relay Server 300 assigns a new Merged Document ID 1201. It associates the ID of the user that sent the instruction with User ID 1202 and stores it. Relay Server 300 stores Document Name 912 of the merged document from Merged Document 1203 through 1205. It stores the description of the process and its setting in Process Type 1206 and Process Setting 1207, respectively. In addition, Relay Server 300 stores Document Name 912, which is the name of the document saved in the update folder in Update Folder Document 1208. It stores the date and time the information was registered at S1429 in Date/Time Last Used 1209.

By registering the process history each time a process is completed, Relay Server 300 is able to retrieve and process the merged document the next time merge process is instructed.

Figure 15:
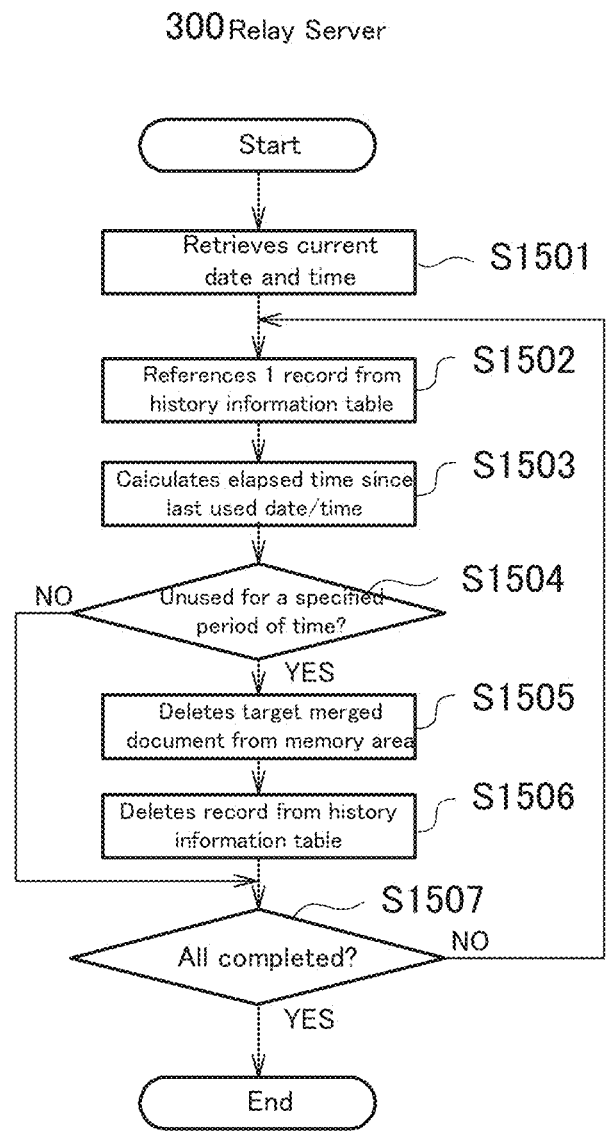
FIG. 15 illustrates a flowchart describes a sample process of relay server 300 in embodiment 1.

FIG. 15 is a flowchart that illustrates a sample process of how Relay Server 300 deletes a merged document that has not been used for a certain period of time from the merged documents saved in Relay Server 300's memory area.

Relay Server 300 executes processes S1501 through S1507 regularly, which are described below.

At S1501, Relay Server 300 retrieves the current date and time. Relay Server 300 may retrieve the current date and time configured on Relay Server 300, or it may retrieve the current date and time from another apparatus.

At S1502, Relay Server 300 references one record from History Information Table 1200, of which every process from S1503 to S1507, which will be described later, is unprocessed.

At S1503, Relay Server 300 retrieves Date/Time Last Used 1209 of the record it is referencing and compares it with the current date and time retrieved at S1501 to calculate the elapsed time. That is, Relay Server 300 calculates how much time has elapsed since it printed, FAXed, or e-mailed the merged document.

At S1504, Relay Server 300 determines whether the merged document of the record it is referencing has been used for a specified period of time based on the elapsed time calculated at S1503. Relay Server 300 may specify a period of time beforehand and determine whether the merged document has been used for a specified period of time by checking whether the specified period of time has been exceeded. Or it may use another method. If Relay Server 300 determines that the merged document has not been used for a specified period of time, it deletes the said merged document from Relay Server 300's memory area. Process at S1505 is an example of time management deletion process, which deletes documents that have not been used for a specified period of time of the merged documents stored in Relay Server 300's memory area.

At S1506, Relay Server 300 deletes the said record it is referencing from History Information Table 1200. Since Relay Server 300's memory area is not unlimited, configuring the system to regularly delete merged documents that are not much used enables Relay Server 300 to utilize its memory area efficiently.

At S1507, Relay Server 300 determines whether processes S1502 through S1506 have been completed for all records stored in History Information Table 1200. If Relay Server 300 determines that processes have been completed for all records, it ends the process. Otherwise, it returns to S1502.

As described above, Relay Server 300 stores the merged documents in Relay Server 300's memory area in this embodiment. When Relay Server 300 receives an instruction to merge the same combination of documents from Client PC 200, it can retrieve the already-merged document and execute the specified process without re-merging the documents. Also, by regularly deleting the merged documents that are not much used, Relay Server 300 can utilize its memory area efficiently.

Hereinafter, embodiment 2 will be described.

In embodiment 1, Relay Server 300 saved the document saved in the update folder in its memory area even if it is included in the merged document. However, if a document saved in the update folder is included in the merged document, Relay Server 300 re-retrieves and merges all documents that constitute the merged document from Document Server 1005. Therefore, there is not much significance in saving the merged documents in Relay Server 300's memory area.

In this embodiment, if a document saved in the update folder is included in the merged document, Relay Server 300 saves the merged document that has only the documents other than the document saved in the update folder merged in its memory area. Relay Server 300 registers that in its history. By doing so, Relay Server 300 only needs to retrieve the documents stored in the update folder, which results in reduced send/receive communication traffic and reduced load of merging documents.

Figure 16:
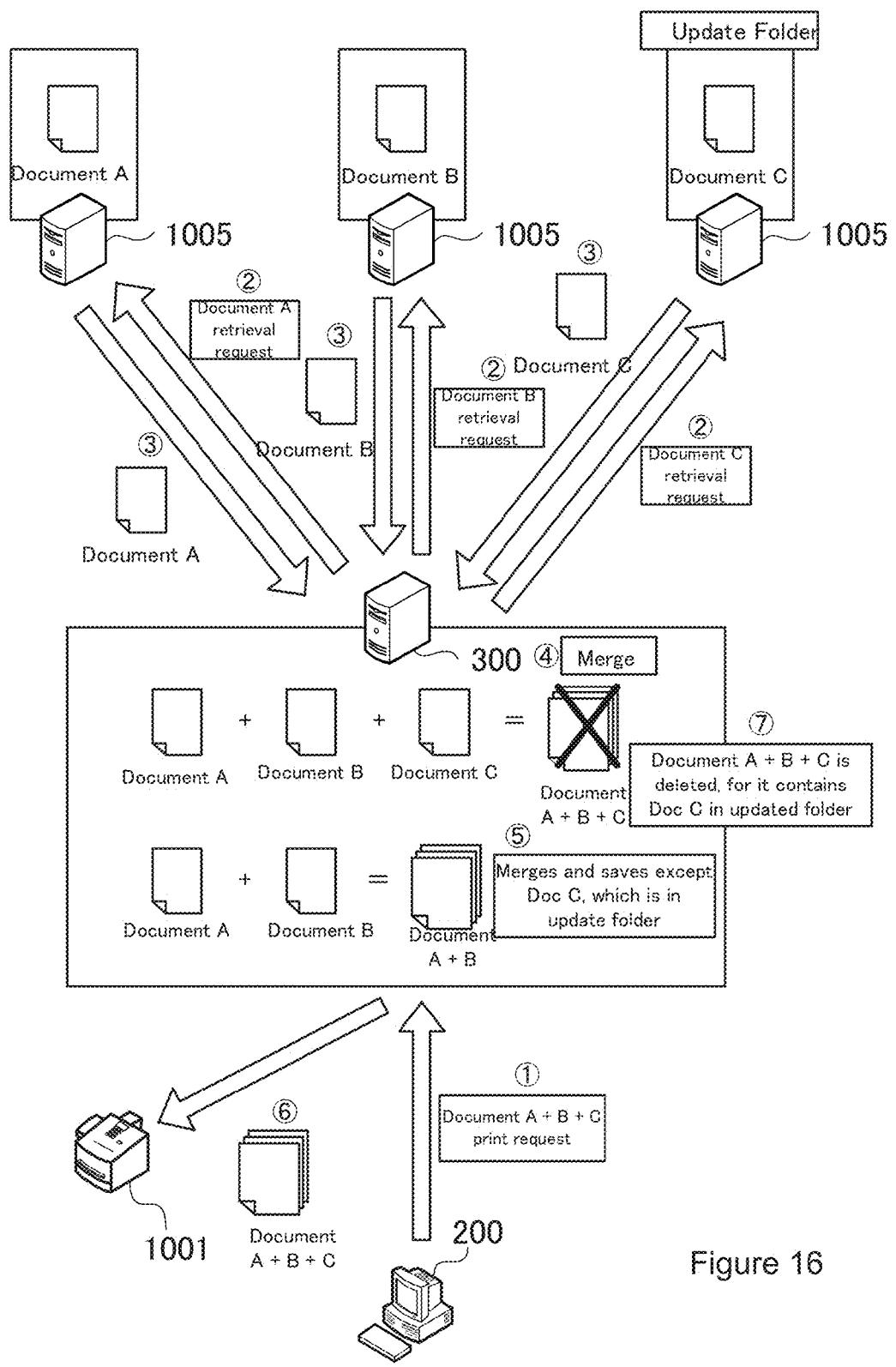
FIG. 16 illustrates a process overview in embodiment 2.

FIG. 16 illustrates a sample process based on a document merge request sent from Client PC 200.

First, Client PC 200 accepts the request to print the merged document that comprises multiple documents stored in Document Server 1005 from the user via an input device. Client PC 200 sends the request to print "Document A+B+C," which is "Document A," "Document B," and "Document C" merged, to Relay Server 300.

When Relay Server 300 receives the request to print "Document A+B+C" from Client PC 200, it specifies the save destination of the requested document from the database Relay Server 300 retains. Relay Server 300 stores such information as document name, server name, and storage folder in its database. It uses such information to specify the save destination of the document. Relay Server 300 sends the request to retrieve the said document to the specified save destination Document Server 1005.

Once Document Server 1005 receives the document retrieval request from Relay Server 300, it retrieves the said document and returns it to Relay Server 300.

When Relay Server 300 receives all the documents sent from Document Server 1005 according to the document retrieval request, it merges them into one document (combined document).

In the example illustrated in FIG. 16, Relay Server 300 sends a retrieval request for "Document A," "Document B," and "Document C" to the respective Document Server 1005 on which each document is stored. When "Document A," "Document B," and "Document C" are all returned from Document Server 1005, Relay Server 300 merges them and generates "Document A+B+C." Since "Document C," which was retrieved, is a document saved in the update folder, Relay Server 300 also generates "Document A+B," in which the specified documents except "Document C" are merged. Relay Server 300 then saves "Document A+B+C" and "Document A+B" it generated into the memory area of Relay Server 300 (External Memory 211, for example), creates a print job for "Document A+B+C" and sends it to Printer 1001.

Figure 17:
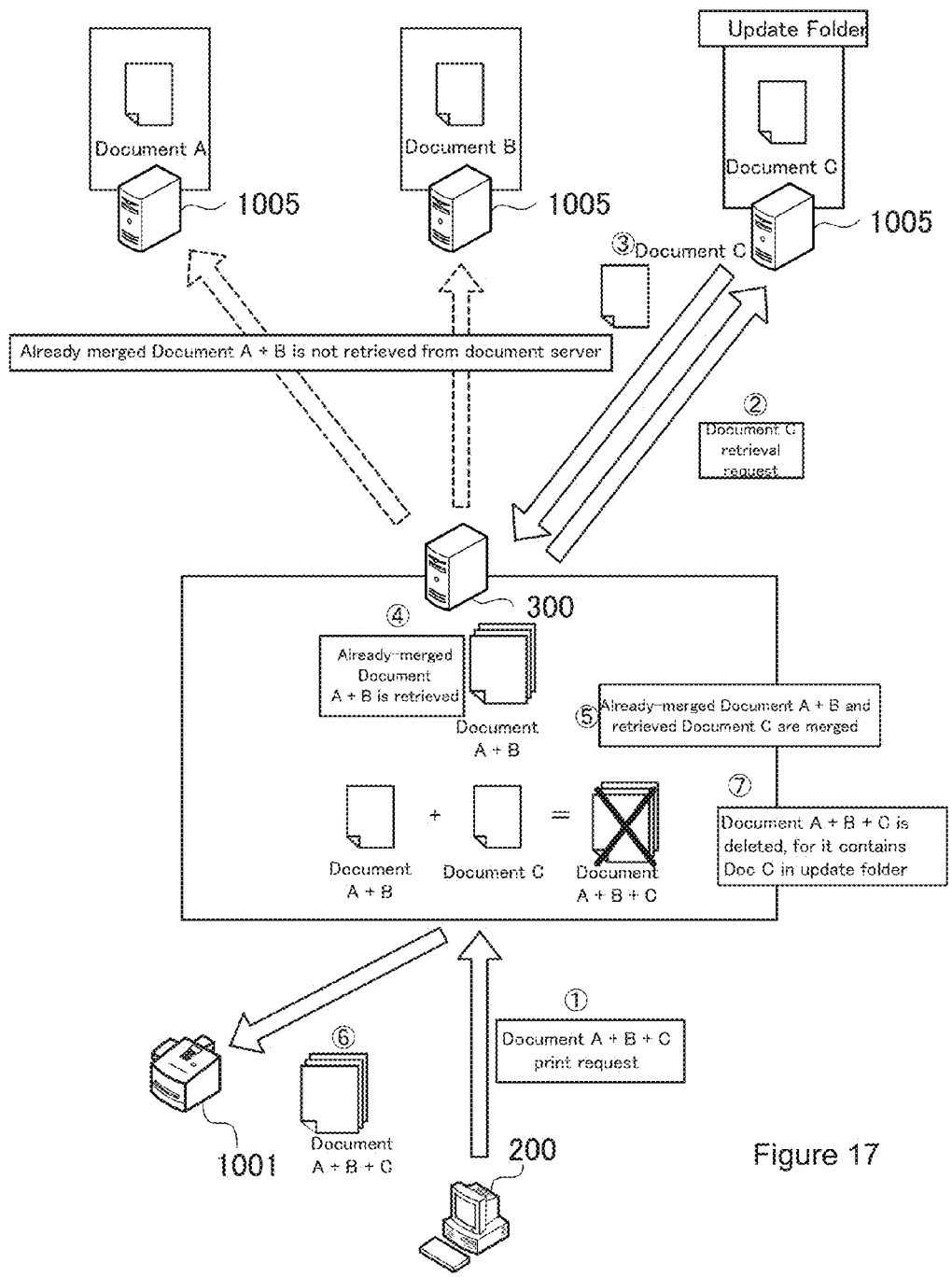
FIG. 17 illustrates a sample process overview of when the same merged document is requested again after the process described in FIG. 16.

FIG. 17 illustrates a sample overview of the process when Client PC 200 sends a request to print the same merged document after the process illustrated in FIG. 16 has been completed.

As in FIG. 16, Client PC 200 accepts the request to retrieve the merged document saved on Document Server 1005 from the user via an input device. Here, let's suppose that Client PC 200 accepted a request to print "Document A+B+C."

When Relay Server 300 receives the request from Client PC 200, it determines whether the requested merged document exists in the memory area of Relay Server 300. In the example illustrated in FIG. 17, since Relay Server 300 already created "Document A+B" in FIG. 17 and saved it in the memory area of Relay Server 300, Relay Server 300 retrieves it first. Since "Document C" is a document stored in the update folder, Relay Server 300 sends a request to retrieve "Document C" to Document Server 1005. After Relay Server 300 receives "Document C" as requested from Relay Server 1005, it merges "Document A+B," which is saved in the memory area of Relay Server 300, and "Document C" it retrieved and generates "Document A+B+C." Relay Server 300 sends the generated "Document A+B+C" to Printer 1001.

Relay Server 300 retrieves documents that are stored in the update folder anew and for other documents utilizes already-merged documents. As a result, process load on Relay Server 300 can be reduced. Once Relay Server 300 completes the process described above, it deletes "Document A+B+C," which contains "Document C," which is stored in the update folder, from the memory area. This mechanism will be described below.

System configuration, hardware configuration, and module configuration in this embodiment are the same as those in embodiment 1, which has been described previously. Flowcharts illustrated in FIG. 7, FIG. 10A, FIG. 10B, and FIG. 15 described in embodiment 1 are also the same. Since the process in this embodiment is a variation of the process illustrated in the flowcharts in FIGS. 14A and 14B, this point will be described.

Figure 18A:
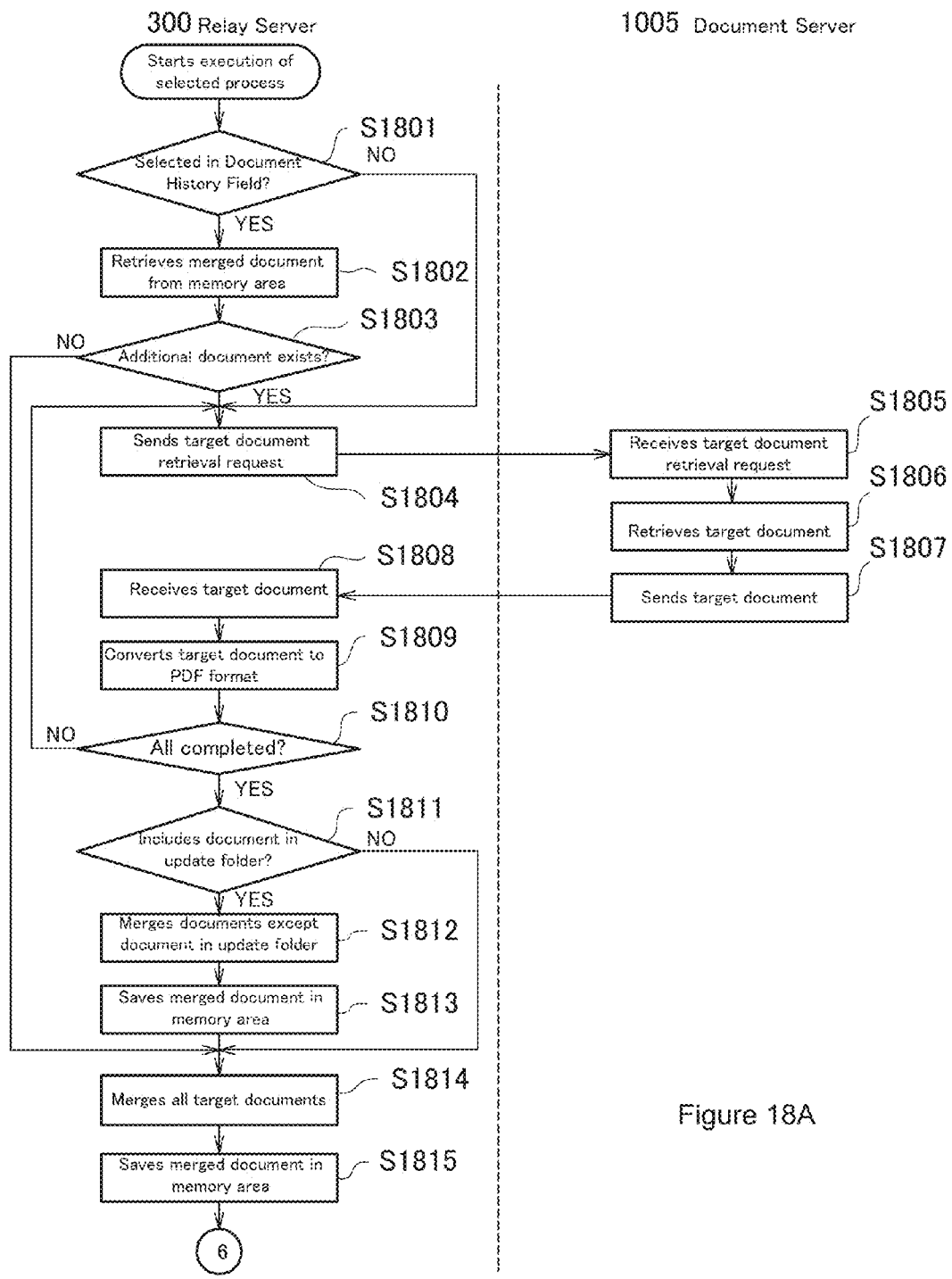
FIG. 18A illustrates a flowchart that describes a sample process (from S1801 to S1815) between the relay server and document server in embodiment 2.
Figure 18B:
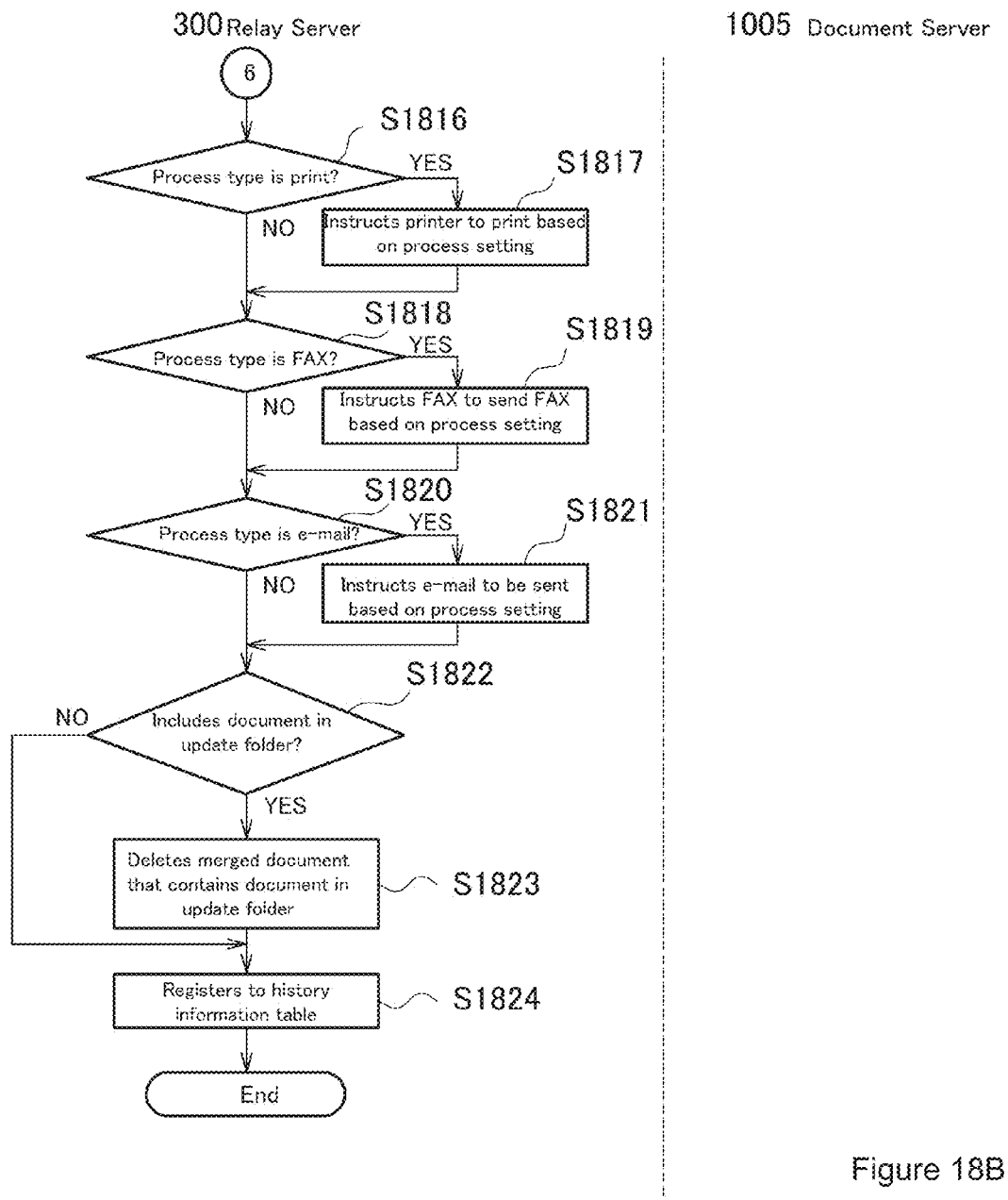
FIG. 18B illustrates a flowchart that describes a sample process (from S1816 to S1824) between the relay server and document server in embodiment 2.

FIG. 18A and FIG. 18B are flowcharts that describe a sample process of Relay Server 300 retrieving documents from Document Server 1005 based on the request from Client PC 200 and executing specified processes. FIG. 18A is a flowchart that describes a sample process from S1801 to S1815. FIG. 18B is a flowchart that describes a sample process from S1816 to S1824.

At S1801, Relay Server 300 determines whether the target documents specified to be merged are the documents selected in Document History Field 1102 in Document Process Page 1100. If Relay Server 300 determines that the documents are the documents selected in Document History Field 1102, it proceeds to S1802. Otherwise (for example, if it is determined that the documents are the documents selected from Document List 1101), it proceeds to S1804. Since the process at S1801 is the same as the process at S1411, which was described previously, detailed description will be omitted.

At S1802, Relay Server 300 retrieves the merged document selected in Document History Field 1102 from the memory area of Relay Server 300. Since the process at S1802 is the same as the process at S1412, which was described previously, detailed description will be omitted.

At S1803, Relay Server 300 determines whether the target documents have been selected in Document List 1101 in addition to Document History Field 1102. If Relay Server 300 determines that the documents are the documents selected in Document List 1101, it proceeds to S1804. Otherwise, it proceeds to S1814. Since the process at S1803 is the same as S1413, which was described previously, detailed description will be omitted.

At S1804, Relay Server 300 sends a request to retrieve the documents that were selected to be merged by user operation via an input device to Document Server 1005, on which the said documents are saved. Since each target document's storage destination varies, Relay Server 300 sends the request to retrieve the target documents to Document Server 1005 by referencing Document Management Table 910. Target documents here refer to documents selected in Document List 1101 (including additional documents).

At S1805, Document Server 1005 receives the request to retrieve the target documents from Relay Server 300.

At S1806, Document Server 1005 retrieves the target documents according to the retrieval request it received.

At S1807, Document Server 1005 sends the target documents received at S1806 to Relay Server 300.

At S1808, Relay Server 300 receives the target documents sent from Document Server 1005.

At S1809, Relay Server 300 uses File Format Conversion Adapter 418 to convert the target documents received at S1808 to PDF format. Since data format details are the same as what has been previously described, their description will be omitted.

At S1810, Relay Server 300 determines whether all target documents selected by user operation via an input device have been received from Document Server 1005. If Relay Server 300 determines that all said target documents have been received, it proceeds to S1811. Otherwise, it returns to S1804.

At S1811, Relay Server 300 determines whether the documents instructed to be merged from Client PC 200 include a document saved in the update folder. More specifically, Relay Server 300 determines whether the combination of Document Server Name 913 of the selected documents and Folder Path 914 has been registered in Update Folder Management Table 900. If Relay Server 300 determines that the document is a document saved in the update folder, it proceeds to S1812. Otherwise, it proceeds to S1814. Process at S1811 is an example of Relay Server 300's update file determination process.

At S1812, Relay Server 300 uses PDF Adapter 415 to merge the retrieved all target documents except the document in the update folder. If it retrieved "Document A," "Document B," and "Document C," and "Document C" was the document saved in the update folder, it merges "Document A" and "Document B" except "Document C" and generates "Document A+B." Since "Document C" is saved ion the update folder, it may be updated. Therefore, even if Relay Server 300 generates "Document A+B+C," it cannot be used. That is why Relay Server 300 merges the documents except "Document C." Also, Relay Server 300 converts the name of the merged document to a document name that merges Document Name 912 of the target documents so that it is easier to identify which documents it comprises. For example, if Relay Server 300 merges "Document A" and "Document B," it describes the document name as "Document A+B." The document name is not limited to this. "Document A+B" is an example of a non-update merged file.

At S1813, Relay Server 300 saves the merged document to the specified memory area such as External Memory 211.

At S1814, Relay Server 300 uses PDF Adapter 415 to merge all target documents specified by Client PC 200 based on user operation via an input device using one file format. Here, an example of Relay Server 300 receiving an instruction to merge "Document A," "Document B," and "Document C" from Client PC 200 will be described.

At S1815, Relay Server 300 saves the merged document merged at S1814 in the specified area such as Relay Server 300's External Memory 211. When Relay Server 300 completes the process, it proceeds to S1816 in FIG. 18B. Process from S1812 to S1815 is an example of Relay Server 300's creation process.

Next, FIG. 18B will be described.

Since the process from S1816 to S1821 is the same as that from S1423 to S1428 described previously, its description will be omitted. It is the merged document merged at S1814 on which various processes from S1816 to S1821 are executed.

At S1822, Relay Server 300 determines whether documents that constitute the merged document include a document saved in the update folder. More specifically, Relay Server 300 determines whether the combination of Document Server Name 913 of the documents that constitute the merged document and Folder Path 914 has been registered in Update Folder Management Table 900. If Relay Folder 300 determines that the document is a document saved in the update folder, it proceeds to S1823. Otherwise, it proceeds to S1824.

At S1823, Relay Server 300 deletes the merged document on which the aforementioned process was performed from Relay Server 300's memory area. If documents that constitute the merged document include a document in the update folder, Relay Server 300 retrieves the said document anew from Document Server 1005, for the said document may be updated. As a result, there is no reason for Relay Server 300 to save the said merged document and deletes it at S1823.

At S1824, Relay Server 300 registers the information regarding the merged document to History Information Table 1200. Information registered here is regarding the merged document that does not include the document in the update folder. That is, if Relay Server 300 received an instruction to merge "Document A," "Document B," and "Document C" from Client PC 200, it registers the history information regarding "Document A+B," which was merged at S1812. However, for process description and configuration, Relay Server 300 registers what was processed between S1816 and S1821 and its configuration. All other registration methods are the same as S1429. Therefore, their description will be omitted.

Thus, by registering the history information each time a process is completed, next time Relay Server 300 receives an instruction to merge documents from Client PC 200, it can retrieve and process an already-merged document. Also, since Relay Server 300 does not register documents in the update folder as history information, nothing will be displayed in Document History Field 1102. In this embodiment, Relay Server 300 registers the documents except the documents in the update folder. However, it may register the documents including the documents in the update folder. In that case, while merged documents that contain documents in the update folder will also be displayed in Document History Field 1102, the document that is stored in Relay Server 300's memory area will be the merged document except the document in the update folder. Thus, Relay Server 300 retrieves the document in the update folder from Document Server 1005, if a merged document that contains a document in the update folder was selected at Document History Field 1102. Then, Relay Server 300 can generate a merged document by merging the document in the update folder, which it retrieved from Document Server 1005, and the already-merged document stored on Relay Server 300.

As described above, in this embodiment, when the documents specified to be merged include a document saved in the update folder, Relay Server 300 merges only the documents except the document saved in the update folder. Relay Server 300 then saves the merged document in the memory area and also registers it to its history. By doing so, Relay Server 300 is able to retrieve only the documents saved in the update folder each time and save all others as merged documents, which results in reduced send/receive communication traffic and reduced load of merging documents.

Hereinafter, embodiment 3 will be described.

In embodiments 1 and 2, Relay Server 300 was able to execute only one process on a merged document. In this embodiment, however, multiple processes can be selected. For example, if Relay Server 300 wishes to retrieve "Document A+B+C" and send it by "print," "FAX," and "e-mail," it would have to retrieve the document for each process from Document Server 1005 in previous embodiments. In this embodiment, however, once Relay Server 300 retrieves a merged document, it can execute all multiple processes on the document. This will be described below.

Figure 19:
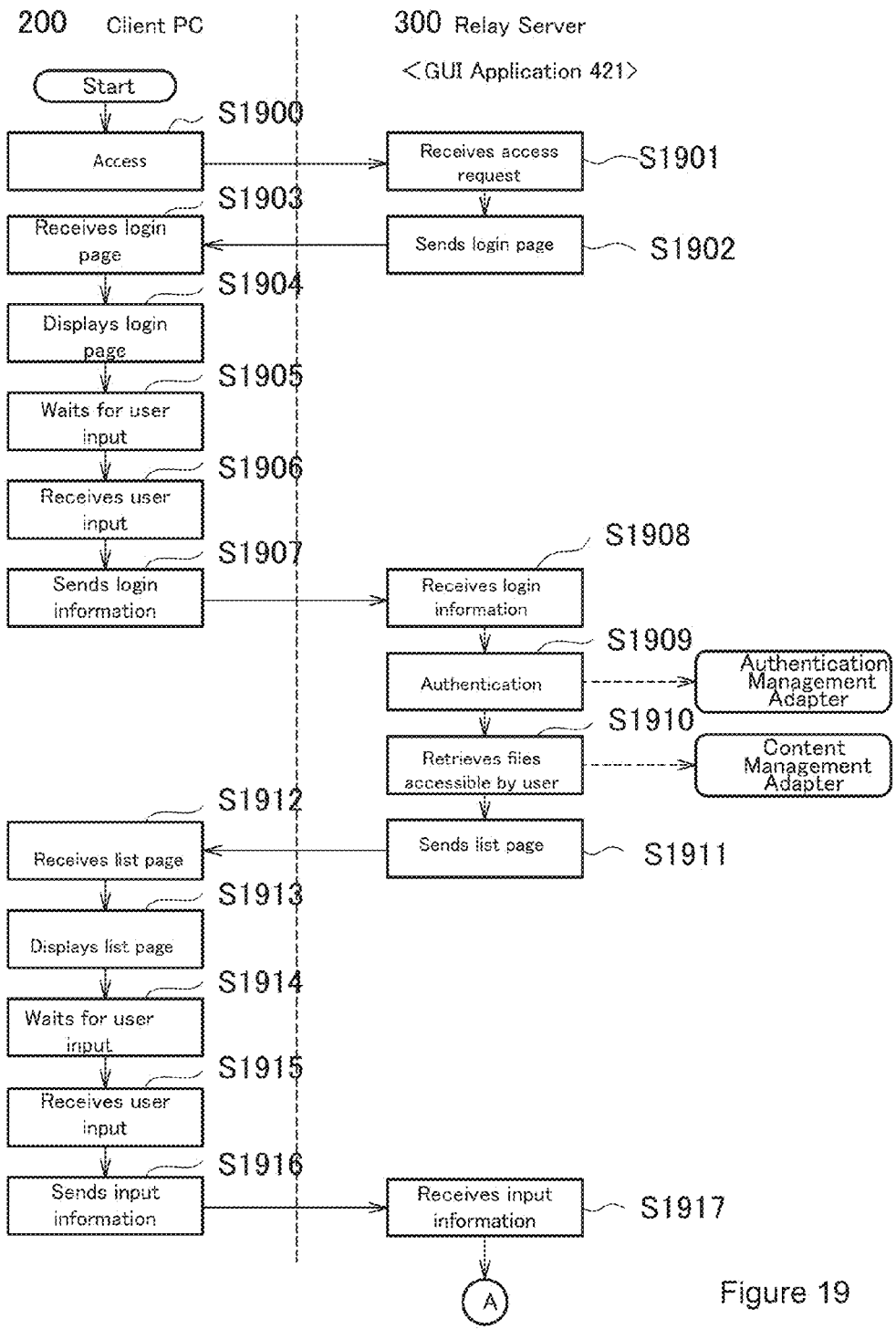
FIG. 19 illustrates a flowchart that describes a sample process (from S1900 to S1917) between the client PC and relay server in embodiment 3.

FIG. 19 is a flowchart that illustrates a sample authentication process and such on Client PC 200 and Relay Server 300.

When Client PC 200 detects an access request from a user via the web browser, it starts the process illustrated in FIG. 19.

At S1900, Client PC 200 accesses Relay Server 300 and sends an access request to Relay Server 300.

At S1901, Relay Server 300 receives the access request.

Figure 20:
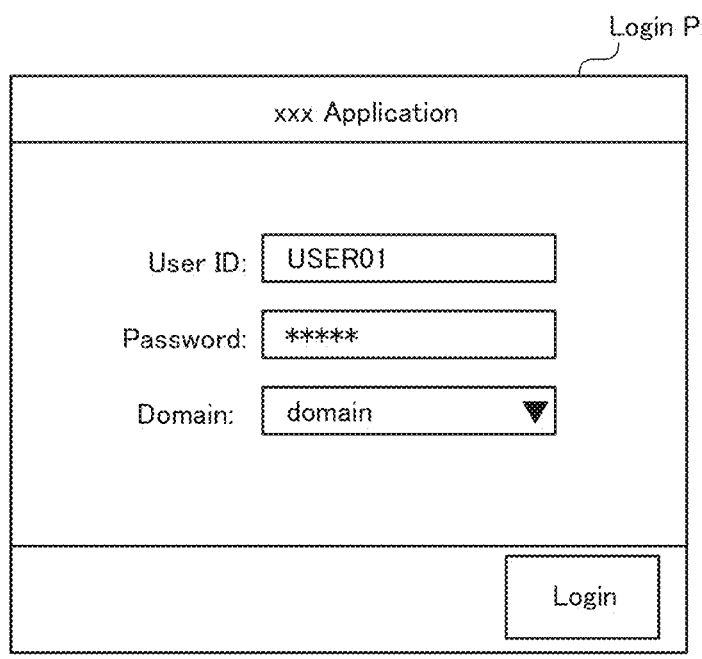
FIG. 20 illustrates a sample login page in embodiment 3.

At S1902, GUI Application 421 sends the information for displaying the login page illustrated in FIG. 20 to Client PC 200. FIG. 20 illustrates a sample login page.

At S1903, Client PC 200 receives the login page.

At S1904, Client PC 200 displays the login page in FIG. 20 on CRT 210.

At S1905, Client PC 200 waits for information required for authentication from the user (hereinafter "login information") and such to be entered and input from the login button in FIG. 20.

At S1906, Client PC 200 receives the information that the login button in FIG. 20 has been pressed by the user.

At S1907, Client PC 200 sends the login information (such as user name, password, and authentication domain) whose input it accepted at S1905 to Relay Server 300.

At S1908, GUI Application 421 receives the login information from Client PC 200.

At S1909, GUI Application 421 calls Authentication Management Adapter 417 and passes the login information it received. Once Authentication Management Adapter 417 verifies that the login information is accurate, it verifies the information regarding the access rights to files and folders of the user that corresponds to the said login information (hereinafter, "access rights information"). Authentication Management Adapter 417 then notifies GUI Application 421 the access control information configured for each document.

Figure 21:
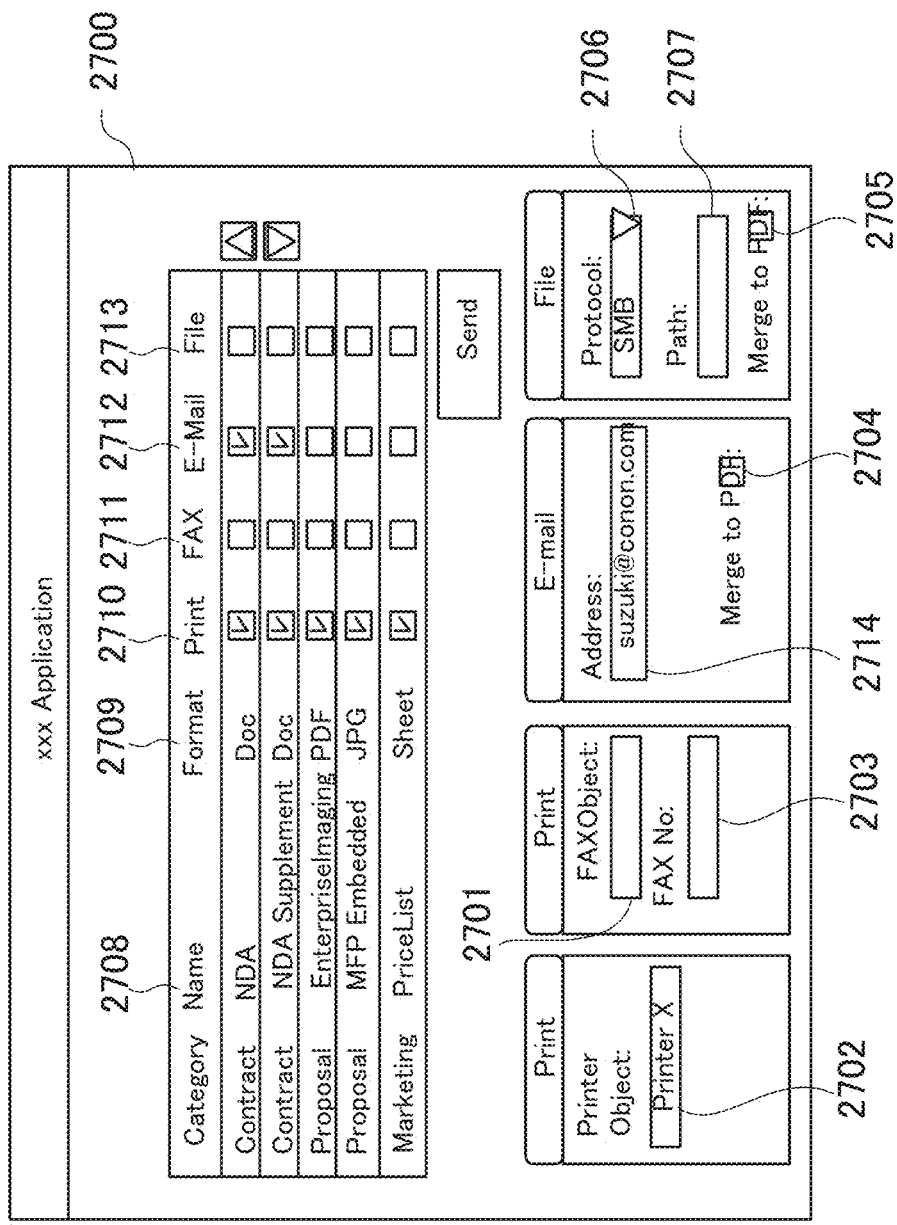
FIG. 21 illustrates a sample list page in embodiment 3.

At S1910, GUI Application 421 sends a request to Content Management Adapter 416 to retrieve a list of files that the user can access (hereinafter "file list") based on the notified access rights information. In addition, GUI Application 421 retrieves the said file list from Content Management Adapter 416. Then, GUI Application 421 configures the page illustrated in FIG. 21 (hereinafter may be referred to as "list page") based on the retrieved said file list. FIG. 21 illustrates a sample list page (screen display) displayed on CRT 210 of Client PC 200.

File list is a list with which Content Management Adapter 416 of Relay Server 300 manages each document's access rights and location by user. Content Management Adapter 416 periodically accesses devices on which documents are saved, such as Document Server 1005. Content Management Adapter 416 manages each document's access rights and location by user.

At S1911, GUI Application 421 sends the list page (display screen) to Client PC 200.

At S1912, Client PC 200 receives the list page sent from Relay Server 300.

At S1913, Client PC 200 displays the list page it received on Client PC 200's CRT 210.

At S1914, Client PC 200 accepts user input on various check boxes and others illustrated in FIG. 21.

At S1915, Client PC 200 waits for the Send button illustrated in FIG. 21 to be pressed by user operation via an input device. Client PC 200 then receives the information that the Send button in FIG. 20 has been pressed by the user via an input device.

Here, list page in FIG. 21 will be described.

On Row 2708, names of documents that the user is allowed to send are displayed.

On row 2709, document formats are displayed. These attributes are retrieved from databases on Document Server 1005 and such or information collected by Content Management Adapter 416 and displayed.

User may specify the process for each document by checking the checkbox on row 2710 for printing, on row 2711 for sending by FAX, row 2712 for sending by e-mail, and row 2713 for sending the file via the network. The example in FIG. 21 shows that the document whose name is "NDA" has a file format of "DOC," which is a file format for a word processing application, and it is specified to be printed and sent elsewhere by e-mail. On this page, user can specify all send methods from print, FAX, e-mail, and file send or a part of multiple send (transfer) methods on one or multiple files.

User may configure the attributes of each transfer method and other settings in field 2701 through 2707. For example, field 2702 corresponds to a combination of printer object at the transfer destination (i.e., printer driver) and port, and user can select one printer object from multiple printer objects. Similarly, user can specify a FAX object in field 2701. In addition, user can specify a FAX number that the FAX object should call in field 2703.

For e-mail, user may specify an e-mail address in field 2714. If user specified multiple files in row 2712, he may specify whether the files should be merged before they are transferred in field 2704.

For file send via the network, user can specify a file transfer protocol, such as FTP and SMB, in field 2706. User can also specify the file path or URI in field 2707. User can also specify whether the files should be merged before they are sent via the network in field 2705 as in field 2704.

At S1916, Client PC 200 creates the information for the message it sends to GUI Application 421 based on the input information accepted at S1914 (hereinafter "message information"). Client PC 200 then sends the said message information (information illustrated in FIG. 22, for example) to GUI Application 421.

FIG. 22 illustrates sample message information that is sent from Client PC 200 to GUI Application 421.

Message information 2801 through 2813 is used for communication management.

Message information 2814 is generated based on the input illustrated in FIG. 21. That is, 5 documents in FIG. 21 are all specified to be printed. Documents that correspond to NDA and NDA Supplement in row 2708 are specified to be e-mailed. Since they are not specified to be sent by FAX or via the network, those values are empty. If they are specified, the values will be set. For printing, a printer object of the send destination is specified. For e-mail, multiple e-mail addresses are specified. "Email Merge" in message information 2814 indicates whether multiple files should be merged when multiple files are selected in row 2712 to be e-mailed. If field 2704 in FIG. 21 is checked, the value "1" will be entered. If it is not checked, "blank" (such as "NULL") will be entered. Similarly, for "FileMerge," the value "1" will be entered if field 2705 in FIG. 21 is checked and blank will be entered if it isn't.

Figure 23:
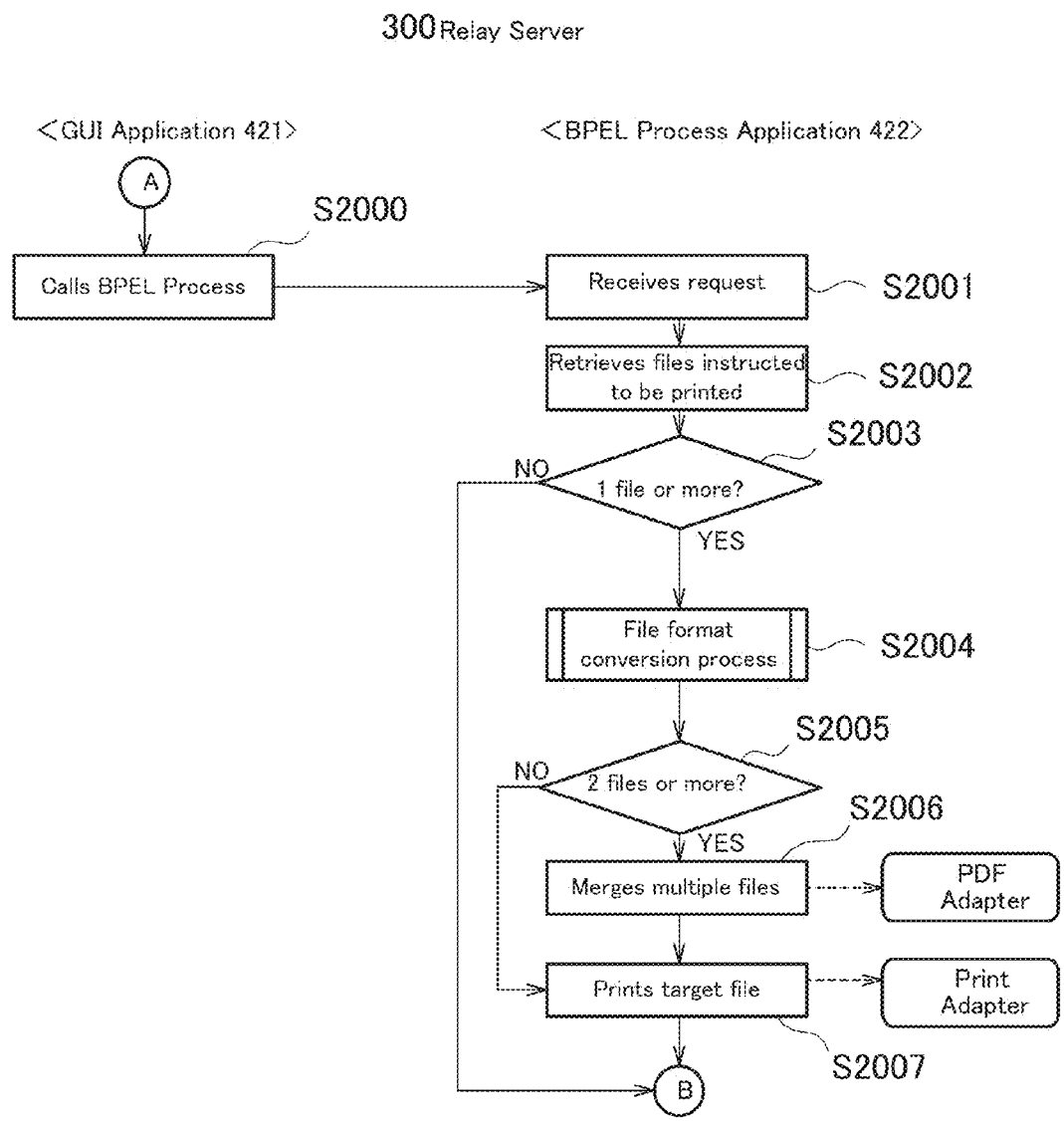
FIG. 23 illustrates a flowchart that describes a sample print process in embodiment 3.

At S1917, once GUI Application 421 receives the message sent at S1916, it proceeds to S2000 in FIG. 23.

FIG. 23 is a flowchart that illustrates a sample print process of this embodiment. A in FIG. 23 corresponds to A in FIG. 18.

At S2000, GUI Application 421 calls BPEL Process based on the message information.

At S2001, BPEL Process Application 422 receives the request from GUI Application 421.

Figure 24:
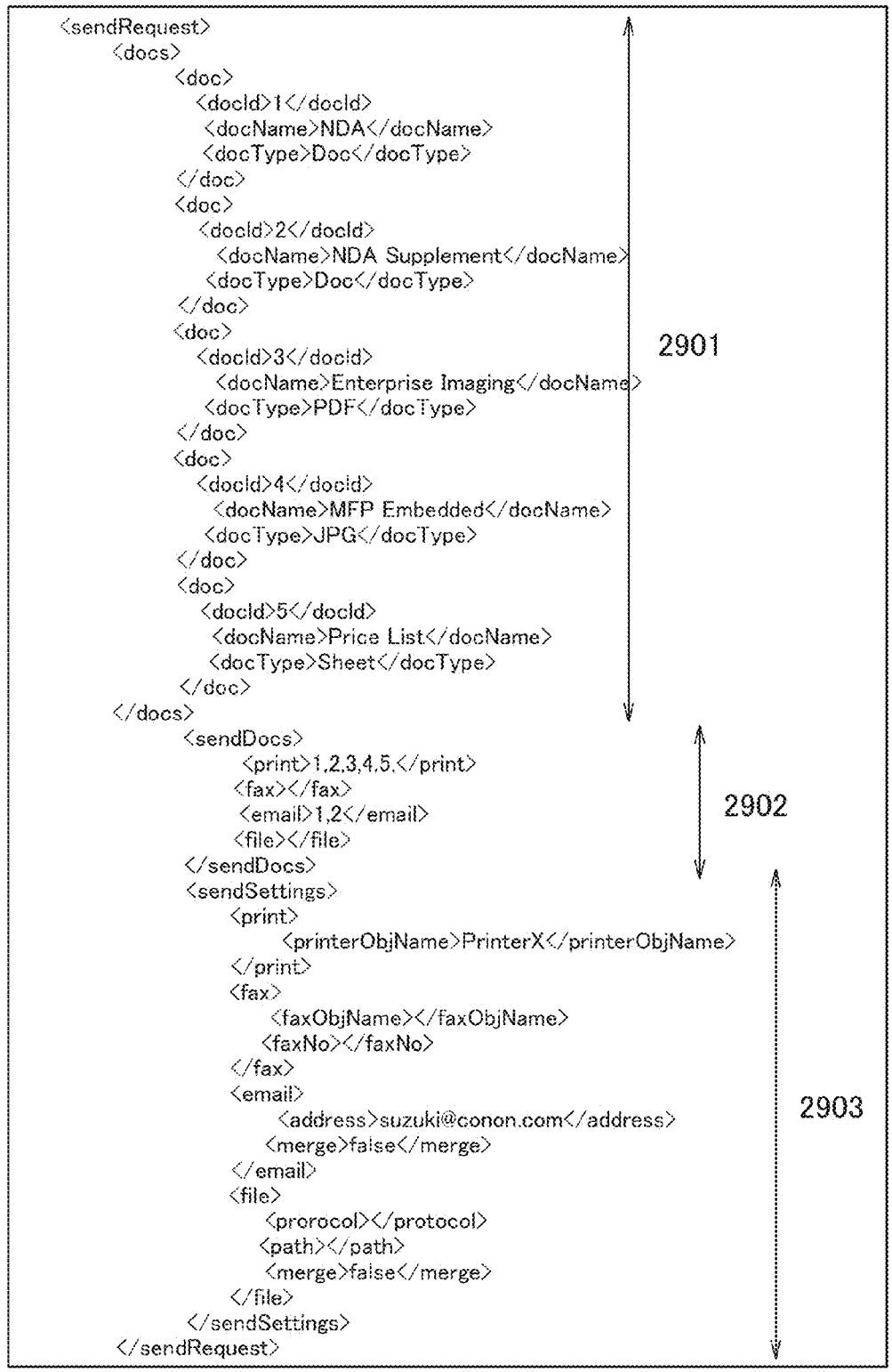
FIG. 24 illustrates a sample request information in embodiment 3.

FIG. 24 illustrates sample request information that is sent from GUI Application 421 to BPEL Process Application 422.

If input illustrated in FIG. 21 is entered on the browser UI of Client PC 200, Client PC 200 generates data similar to what is illustrated in FIG. 22 and sends the data to GUI Application 421. Then, GUI Application 421 generates data similar to what is illustrated in FIG. 24 based on the data it received, which is similar to FIG. 22, and sends it to BPEL Process Application 422. BPEL Process Application 422 interprets the data in FIG. 24 and calls the required adapter. For example, when each adapter is called, FAX driver, printer driver, e-mail transmission program, or network file send application that corresponds to the respective adapter is launched and sends the data.

To explain FIG. 24 in further detail, at 2901, enclosed by <docs></docs> tags, five documents are specified. The first document is a file whose document name is "NDA" and document type is "DOC," which is a word processing application format. The second document's document name is "NDA Supplement," and its document type is also "DOC." The third document's document name is "Enterprise Imaging," and its document type is "PDF." The fourth document's document name is "MFP Embedded," and its document type is "JPG." And the fifth document's document name is "Price List," and its document type is "sheet," which is a spreadsheet application file format.

Area 2902 enclosed by <sendDocs></sendDocs> tags indicates an example of send methods. It specifies that documents 1, 2, 3, 4, and 5 be printed, that is, be transferred to a printer among others. Here, no document is specified to be FAXed. It specifies that documents 1 and 2 be e-mailed. No document is specified to be transmitted by network send.

Area 2903 enclosed by <sendSettings></sendSettings> tags specifies the send setting for each send method. For example, printer object name is specified using <print></print> tags. FAX object is specified using <fax></fax> tags. With <address></address>, e-mail address can be specified. With <merge></merge> tags, when multiple files are specified by <sendDocs>, whether or not the multiple files that are specified to be transmitted by e-mail should be merged or not is specified. With <file></file>, file transfer protocol (SMB and FTP, for example), file path, or URI is specified. Similarly, with <merge></merge> tags, when multiple files are specified by <sendDocs>, whether or not the multiple files that are specified to be transmitted by network send should be merged is specified. Hereinafter, this message may be called "specification message."

Following S2001, BPEL Process Application 422 retrieves the file instructed to be printed at S2002. This is processed by BPEL Process Application 422 analyzing the specification message, such as messages 2901, 2902, and 2903 in FIG. 24. The same applies to the following processes as well.

At S2003, BPEL Process Application 422 determines whether the file it retrieved at S2002 is one file or more. That is, BPEL Process Application 422 determines whether any specified files exist. If BPEL Process Application 422 determines that 1 or more files are specified, it proceeds to S2004. If BPEL Process Application 422 determines that no file is specified, it proceeds to B in FIG. 25, which will be described later.

At S2004, BPEL Process Application 211 converts the file format, and it proceeds to S2005. Details on file format conversion will be described later using FIG. 30.

At S2005, BPEL Process Application 422 determines whether there are 2 or more files that were retrieved at S2002. If BPEL Process Application 422 determines that that there are 2 or more files, it proceeds to S2006. If not, it proceeds to S2007.

At S2006, BPEL Process Application 422 calls PDF Adapter 415 and makes PDF Adapter 415 execute the file merge process. BPEL Process Application 422 retrieves the PDF merged as a result of the file merge process from PDF Adapter 415 and saves it in the specified folder of Relay Server 300.

At S2007, BPEL Process Application 422 instructs Print Adapter 411 to print the merged file or one file. Print Adapter 411 enters the specified file to the printer driver that corresponds to the specified printer object. Printer driver analyzes the provided file and creates print data, sends the print data to the print destination specified by the printer driver (MFP 1001 or 1002 that corresponds to the port, for example), and has it printed. BPEL Process Application 422 then proceeds to B in FIG. 25.

Figure 25:
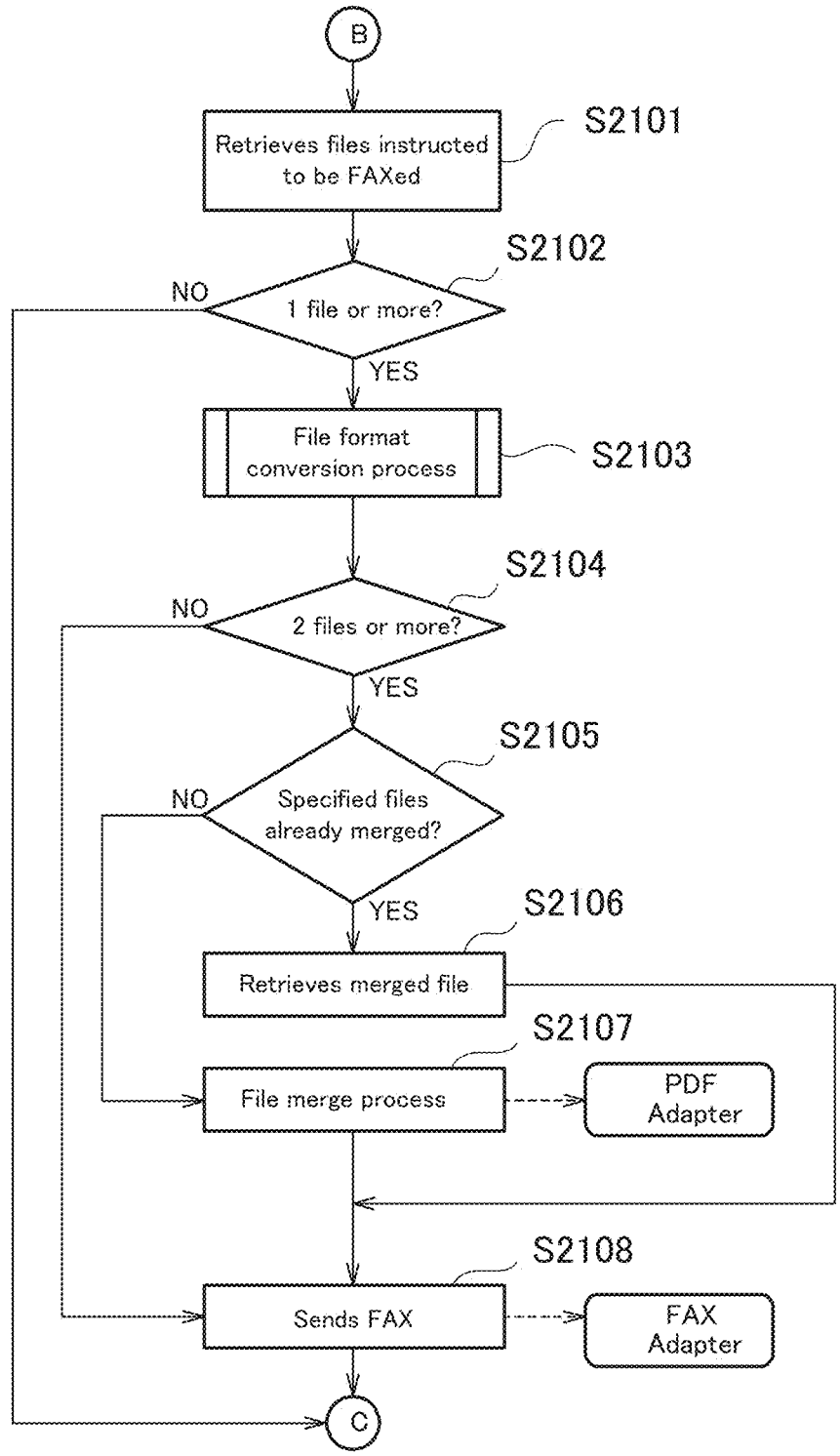
FIG. 25 illustrates a flowchart that describes a sample FAX send process in embodiment 3.

FIG. 25 is a flowchart that illustrates a sample FAX transmission process of the embodiment.

At S2101, BPEL Process Application 422 retrieves the file instructed to be transmitted by FAX. This may be processed by BPEL Process Application 422 analyzing the specification message, such as messages 2901, 2902, and 2903 in FIG. 24. The same applies to the following processes as well.

At S2102, BPEL Process Application 422 determines whether the file it retrieved at S2101 is one file or more. That is, BPEL Process Application 422 determines whether any specified files exist. If BPEL Process Application 422 determines that 1 or more files are specified, it proceeds to S2103. If BPEL Process Application 422 determines that no file is specified, it proceeds to C in FIG. 26, which will be described later.

At S2103, BPEL Process Application 422 converts the file format and converts the file retrieved at S2101 to a format that can be FAXed. Details on the file format conversion will be described later using FIG. 30.

At S2104, BPEL Process Application 422 determines whether there are 2 or more files that were retrieved at S2105. If BPEL Process Application 422 determines that that there are 2 or more files, it proceeds to S2006. If not, it proceeds to S2108.

At S2105, BPEL Process Application 422 verifies whether the specified files are already merged. If it determines that the files are already merged, it proceeds to S2106. If BPEL Process Application 422 determines that the files are not merged, it proceeds to S2107. More specifically, BPEL Process Application 422 verifies whether the results of the merge process at S2006, which has already been described, or at S2107, S2208, and S2308, which will be described later, exist in the specified folders.

At S2106, BPEL Process Application 422 retrieves the merged file from the specified folder and proceeds to S2108.

At S2107, BPEL Process Application 422 calls PDF Adapter 415, instructs PDF Adapter 415 to merge the files, and saves it to the specified folder. Then, it proceeds to S2108.

At S2108, BPEL Process Application 422 calls FAX Adapter 412 and sends the merged file or one file selected by the user at S1915 or a specified file by specifying a FAX number to the specified FAX object. At S2108, BPEL Process Application 422 may process necessary format conversions as well. It then proceeds to C in FIG. 26.

Figure 26:
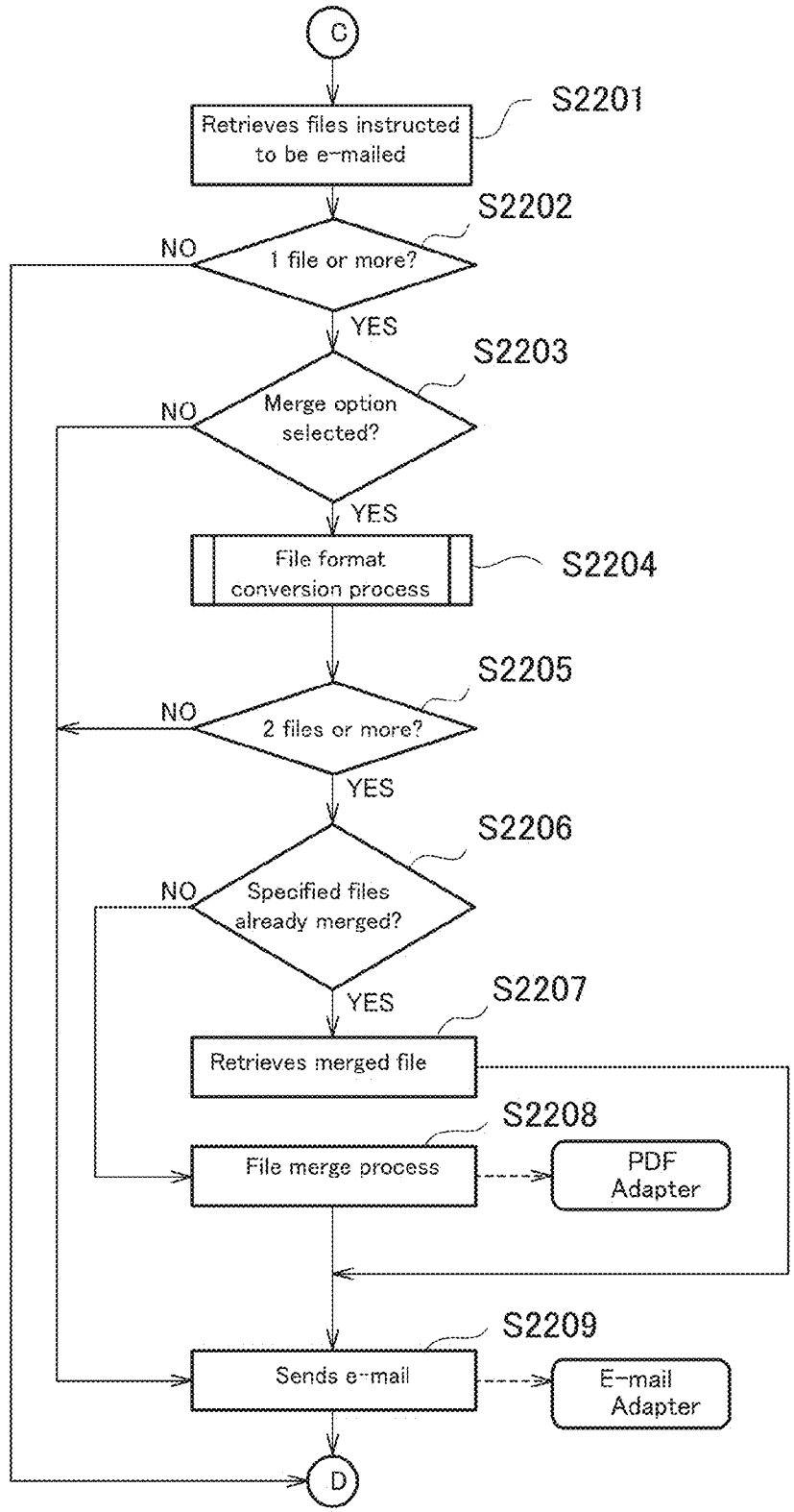
FIG. 26 illustrates a flowchart that describes a sample e-mail send process in embodiment 3.

FIG. 26 is a flowchart that illustrates a sample e-mail transmission process of the embodiment.

At S2201, BPEL Process Application 422 retrieves the file instructed to be transmitted by e-mail. This may be processed by BPEL Process Application 422 analyzing the specification message, such as messages 2901, 2902, and 2903 in FIG. 24. The same applies the following processes as well.

At S2202, BPEL Process Application 422 determines whether the file it retrieved at S2201 is one file or more. That is, BPEL Process Application 422 determines whether any specified files exist. If BPEL Process Application 422 determines that 1 or more files are specified, it proceeds to S2203. If BPEL Process Application 422 determines that no file is specified, it proceeds to D in FIG. 27, which will be described later.

At S2203, BPEL Process Application 422 determines whether the merge option is specified. If it determines that it is, it proceeds to S2204. If BPEL Process Application 422 determines that it is not specified, it proceeds to S2209. More specifically, BPEL Process Application 422 makes the determination by verifying the information 2704 in FIG. 21, which is located in the message received from Client PC 200.

At S2209, BPEL Process Application 422 sends the specified file, and it proceeds to D in FIG. 27, which will be described later.

At 2204, BPEL Process Application 422 converts the necessary file, and it proceeds to S2205. Details on the file format conversion will be described later using FIG. 30.

At S2205, BPEL Process Application 422 determines whether there are 2 or more files that were retrieved at S2201. If BPEL Process Application 422 determines that that there are 2 or more files, it proceeds to S2206. If not, it proceeds to S2209.

At S2206, BPEL Process Application 422 verifies whether the specified files are already merged. If it determines that the files are already merged, it proceeds to S2207. If BPEL Process Application 422 determines that the files are not merged, it proceeds to S2208. Since the details of BPEL Process Application 422's process at S2206 are the same as S2105, which were previously described, they will be omitted here.

At 2207, BPEL Process Application 422 retrieves the merged file from the specified folder. The process then proceeds to S2209.

At S2208, BPEL Process Application 422 calls PDF Adapter 415, instructs PDF Adapter 415 to merge the files, and saves it to the specified folder. Then, it proceeds to S2209.

At S2209, BPEL Process Application 422 calls E-mail Adapter 414 and sends the merged file or one file selected by the user at S1915 or a specified file by specifying an e-mail address. The process then proceeds to D in FIG. 27.

Figure 27:
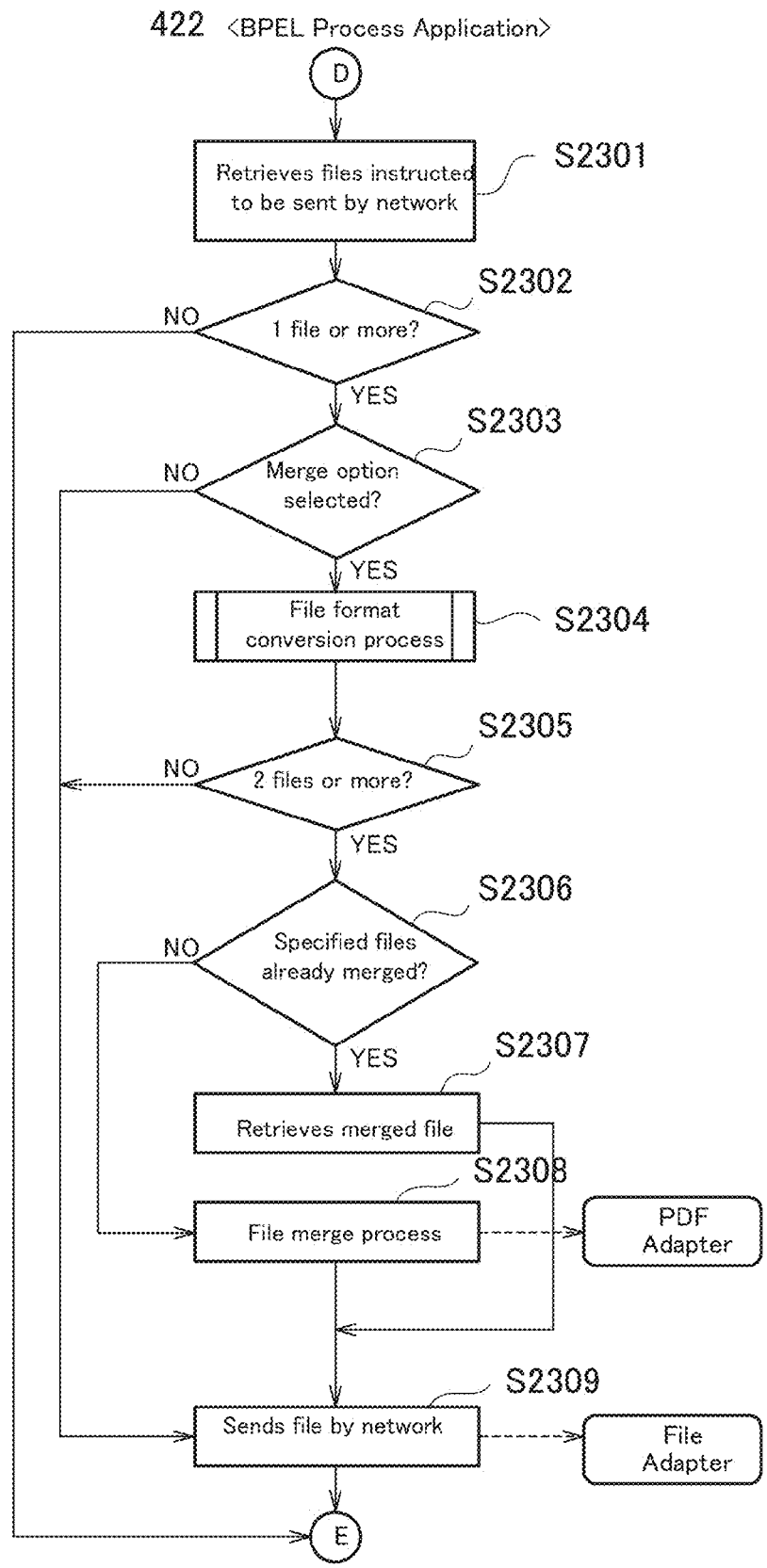
FIG. 27 illustrates a flowchart that describes a sample file send process in embodiment 3.

FIG. 27 is a flowchart that illustrates a sample file transmission process that uses a file management or file transfer protocol.

At S2301, BPEL Process Application 422 retrieves the file instructed to be transmitted using the specified file management or file transfer protocol. This may be processed by BPEL Process Application 422 analyzing the specification message, such as messages 2901, 2902, and 2903 in FIG. 24. The same applies to the following processes as well.

At S2302, BPEL Process Application 422 determines whether the file it retrieved at S2301 is one file or more. That is, BPEL Process Application 422 determines whether any specified files exist. If BPEL Process Application 422 determines that 1 or more files are specified, it proceeds to S2303. If BPEL Process Application 422 determines that no file is specified, it proceeds to E in FIG. 28, which will be described later.

At S2303, BPEL Process Application 422 determines whether the merge option is specified. If it determines that it is not, it proceeds to S2304. If BPEL Process Application 422 determines that it is not, it proceeds to S2309. Since the details of BPEL Process Application 422's process at S2303 are the same as S2203, which were previously described, they will be omitted here.

At S2309, BPEL Process Application 422 sends the specified file. The process then proceeds to E in FIG. 28, which will be described later.

At S2304, BPEL Process Application 422 executes the necessary file format conversion, and it proceeds to S2305. Details on the file format conversion will be described later using FIG. 30.

At S2305, BPEL Process Application 422 determines whether there are 2 or more files that were retrieved at S2301. If BPEL Process Application 422 determines that that there are 2 or more files, it proceeds to S2306. If not, it proceeds to S2309.

At S2306, BPEL Process Application 422 verifies whether the specified files are already merged. If it determines that the files are already merged, it proceeds to S2307. If BPEL Process Application 422 determines that the files are not merged, it proceeds to S2308. Since the details of BPEL Process Application 422's process at S2306 are the same as S2105 and S2206, which were previously described, they will be omitted here.

At 2307, BPEL Process Application 422 retrieves the merged file from the specified folder and proceeds to S2309.

At S2308, BPEL Process Application 422 calls PDF Adapter 415, instructs PDF Adapter 415 to merge the files, and saves it to the specified folder. Then, it proceeds to S2309.

At S2309, BPEL Process Application 422 calls E-mail Adapter 414 and sends the merged file or one file selected by the user at S1915 using the specified file management protocol or file transfer protocol. The process then proceeds to E in FIG. 28, which will be described later.

Figure 28:
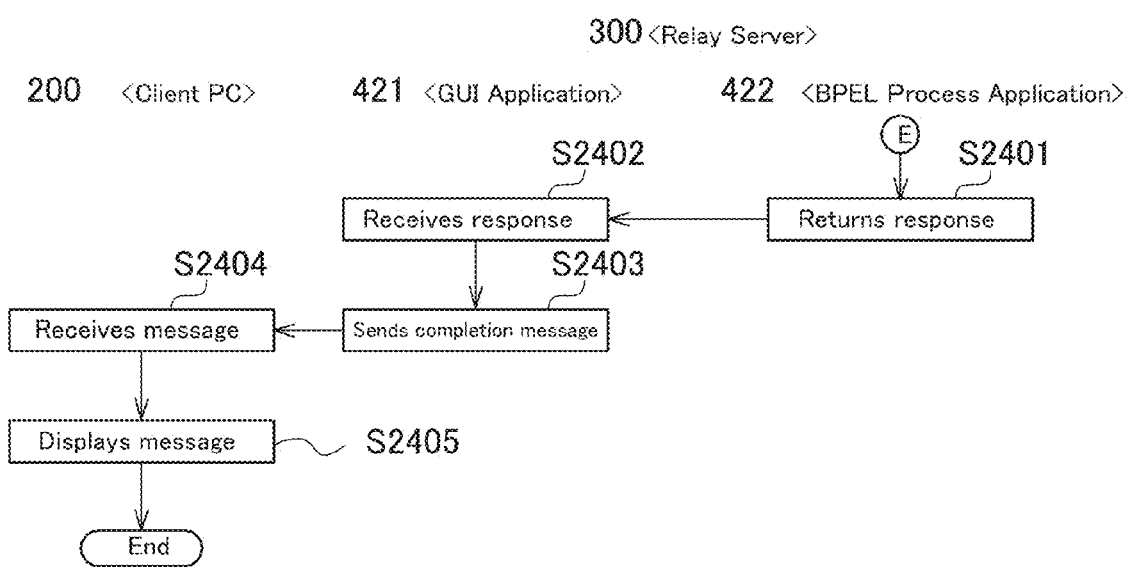
FIG. 28 illustrates a sample process related to sending/receiving the completion message in embodiment 3.

FIG. 28 is a flowchart that illustrates a sample exchange of completion messages of the embodiment.

At S2401, BPEL Process Application 422 returns a response that contains such process results as illustrated in FIG. 29 to GUI Application 421.

FIG. 29 is a diagram that illustrates sample response information that contains the process results.

3001 in FIG. 29 indicates a process completion message. 3002 in FIG. 29 indicates an error message.

At S2402, GUI Application 421 receives the response from BPEL Process Application 422.

At S2403, GUI Application 421 sends a message based on the information in FIG. 29 to Client PC 200.

At 2404, Client PC 200 receives the message from Relay Server 300.

At 2405, Client PC 200 displays the process results (information displayed in 3001 or 3002 in FIG. 29, for example) based on the message it received at S2404.

Figure 30:
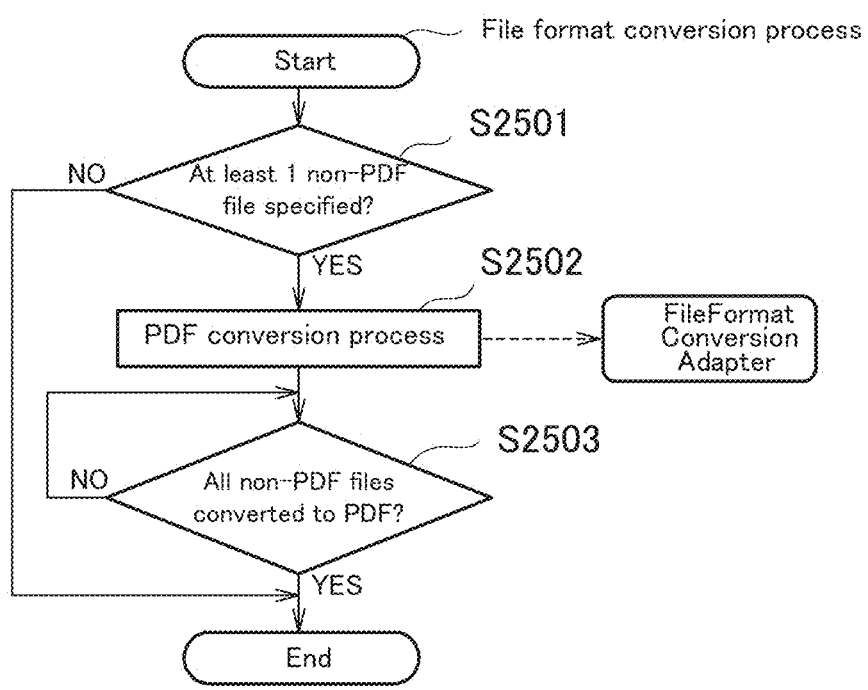
FIG. 30 illustrates a flowchart that describes a sample file format conversion process in embodiment 3.

FIG. 30 is a flowchart that illustrates a sample file format conversion process that can be executed in FIG. 23, 25, 26, or 27.

At S2501, BPEL Process Application 422 determines whether at least one non-PDF file was specified by user operation at S1915. If it determines that it was specified, it proceeds to S2502. If BPEL Process Application 422 determines that no file was specified, it ends the process.

At S2502, BPEL Process Application 422 calls File Format Conversion Adapter 418 and converts the specified non-PDF file into PDF.

At S2503, BPEL Process Application 422 determines whether all non-PDF files selected by user operation at S1915 have been converted to PDF. If BPEL Process Application 422 determines that all non-PDF files have been converted to PDF, it ends the process. If BPEL Process Application 422 determines that not all non-PDF files have been converted to PDF, it waits for the process. BPEL Process Application 422 may set a timer at this point so that error handling takes place after a specified amount of time.

If format conversion is used, the following restrictions may be added to the aforementioned specification. For example, when GUI Application 421 creates a list page at S1910 in FIG. 19, it may be configured to use one common format. A common format is a common format that Printer Adapter 411, FAX Adapter 412, E-mail Adapter 414, and File Adapter 413 can all process. For example, at S1910, GUI Application 421 may create a list page that only displays PDF files. In that case, GUI Application 421 generates information for displaying a page illustrated in FIG. 31 instead of FIG. 21 at S1910.

By doing so, GUI Application 421 can send PDF data to Printer Adapter 411, FAX Adapter 412, E-mail Adapter 414, and File Adapter 413.

In this embodiment, user can instruct the specified files using the specified transfer methods to be sent by checking the files he wishes to send and specifying a FAX object, printer object, e-mail address, or a file send path. Of course, user may specify all or a part of printer object, FAX object, e-mail address, or file send path and instruct at least one specified file to be transferred.

As described above, in this embodiment, Relay Server 300 may execute multiple processes on one merged document. For example, Relay Server 300 may execute "print," "FAX," and "e-mail" processes on one merged document "Document A+B+C" it retrieved.

This embodiment may also be realized by executing the following process. In the process, software (program) that realizes the functionality of the embodiments described above is provided for the system or apparatus via the network or various memory media, and the computer of the system or apparatus (or CPU or MPU) reads and executes the program.

According to each embodiment described above, Relay Server 300 saves the merged documents in its memory area, and if it receives a request to create a merged document with the same combination of documents, it retrieves the said merged document from the memory area. Also, if the documents that are specified to be merged include a document stored in the update folder, it saves the merged document in which all specified documents except the document stored in the update folder are merged in the memory area. By doing so, Relay Server 300 only needs to retrieve the documents that are stored in the update folder each time. Additionally, Relay Server 300 is able to execute multiple processes on one merged document. All this reduces the process load of Relay Server 300.

The preferred embodiment of this invention has been described above. This embodiment, however, is not restricted to a specific embodiment. Instead, this invention may be carried out in various forms without departing from its scope described in the gist of this invention described in the scope of the claim of the invention.

What is claimed is:

1. A method comprising:
receiving, at a server from a client, a request to merge multiple files to generate a first merged file and send the first merged file to a destination, the multiple files comprising a first file, a second file, and a third file;
retrieving the multiple files;
generating the first merged file using the multiple files, the generating the first merged file comprising merging the first file, the second file, and the third file to generate the first merged file;
storing, at the server, the first merged file;
identifying a storage location of the third file;
determining, based on the storage location of the third file, that the third file is a file that may be updated;
in response to determining that the third file is a file that may be updated, generating a second merged file that includes the first file and the second file and not the third file, the second merged file different from the first merged file, wherein the generating the second merged file comprises merging the multiple files except the third file based on the determination that the third file is a file that may be updated;
storing, at the server, the second merged file; and
sending, from the server to the destination, the first merged file in response to the request.

2. The method of claim 1, further comprising:
receiving, at the server, a second request, the second request comprising a request to merge the first file and the second file;
determining that the second merged file is stored at the server; and
sending, from the server, the second merged file in response to the second request.

3. The method of claim 1, further comprising:
receiving, at the server, a second request;
retrieving a file from a folder;
generating a third merged file using the second merged file and the file from the folder; and
sending, from the server, the third merged file in response to the second request,
wherein the retrieving the multiple files comprises retrieving the third file from the folder.

4. The method of claim 1, further comprising:
determining that the second merged file has not been used for a predefined amount of time; and
in response to determining that the second merged file has not been used for the predefined amount of time, deleting the second merged file stored at the server.

5. The method of claim 1, further comprising:
determining whether at least one of the multiple files is a file that may be updated; and
based on the determination that the third file is a file that may be updated and after the sending the first merged file to the destination, deleting the first merged file stored at the server.

6. The method of claim 1, wherein the request comprises a request to merge the multiple files to generate the first merged file and send the first merged file to the destination and a second destination, and
wherein the sending, from the server to the destination, the first merged file comprises sending the first merged file using a first protocol,
the method further comprising:
sending, from the server to the second destination, the first merged file using a second protocol, the second protocol different from the first protocol.

7. The method of claim 1, further comprising:
converting a format of the first file to a predetermined file format;
converting a format of the second file to the predetermined file format; and
converting a format of the third file to the predetermined file format,
wherein the generating the first merged file is performed after the format of each of the first file, the second file, and the third file is converted to the predetermined file format, and
wherein the merging the first file, the second file, and the third file to generate the first merged file comprises merging the first file having the predetermined file format, the second file having the predetermined file format, and the third file having the predetermined file format to generate the first merged file having the predetermined file format.

8. The method of claim 1, wherein the determining that the third file is a file that may be updated comprises determining that the storage location of the third file corresponds to a folder that contains one or more files that may be updated.

9. The method of claim 1, further comprising:
registering folder information at the server, the folder information corresponding to a folder that contains one or more files that may be updated,
wherein the retrieving the multiple files includes retrieving the third file using location information associated with the third file, the location information comprising information for locating the third file, and
wherein the determining that the third file is a file that may be updated comprises using the location information and the folder information to determine that the third file is a file that may be updated.

10. A non-transitory computer-readable medium storing instructions that, when executed by one or more processors, cause the one or more processors to perform operations comprising:
receiving, at a server from a client, a request to merge multiple files to generate a first merged file and send the first merged file to a destination, the multiple files comprising a first file, a second file, and a third file;
retrieving the multiple files;
generating the first merged file using the multiple files, the generating the first merged file comprising merging the first file, the second file, and the third file to generate the first merged file;
storing, at the server, the first merged file;
identifying a storage location of the third file;
determining, based on the storage location of the third file, that the third file is a file that may be updated;
in response to determining that the third file is a file that may be updated, generating a second merged file that includes the first file and the second file and not the third file, the second merged file different from the first merged file, wherein the generating the second merged file comprises merging the multiple files except the third file based on the determination that the third file is a file that may be updated;
storing, at the server, the second merged file; and
sending, from the server to the destination, the first merged file in response to the request.

11. An apparatus comprising:
one or more processors; and
one or more computer-readable media coupled to the one or more processors, the one or more computer-readable media storing instructions that, when executed by the one or more processors, cause the one or more processors to perform operations comprising:

receiving, at a server from a client, a request to merge multiple files to generate a first merged file and send the first merged file to a destination, the multiple files comprising a first file, a second file, and a third file;

retrieving the multiple files;

generating the first merged file using the multiple files, the generating the first merged file comprising merging the first file, the second file, and the third file to generate the first merged file;

storing, at the server, the first merged file;

identifying a storage location of the third file;

determining, based on the storage location of the third file, that the third file is a file that may be updated;

in response to determining that the third file is a file that may be updated, generating a second merged file that includes the first file and the second file and not the third file, the second merged file different from the first merged file, wherein the generating the second merged file comprises merging the multiple files except the third file based on the determination that the third file is a file that may be updated;

storing, at the server, the second merge file; and sending, from the server to the destination, the first merged file in response to the request.

12. The apparatus of claim 11, the operations further comprising:

receiving, at the server, a second request, the second request comprising a request to merge the first file and the second file;

determining that the second merged file is stored at the server; and sending, from the server, the second merged file in response to the second request.

13. The apparatus of claim 11, the operations further comprising:

receiving, at the server, a second request;

retrieving a file from a folder;

generating a third merged file using the second merged file and the file from the folder; and sending, from the server, the third merged file in response to the second request, wherein the retrieving the multiple files comprises retrieving the third file from the folder.

14. The apparatus of claim 11, the operations further comprising:

determining that the second merged file has not been used for a predefined amount of time; and in response to determining that the second merged file has not been used for the predefined amount of time, deleting the second merged file stored at the server.

15. The apparatus of claim 11, the operations further comprising:

determining whether at least one of the multiple files is a file that may be updated; and based on the determination that the third file is a file that may be updated and after the sending the first merged file to the destination, deleting the first merged file stored at the server.

16. The apparatus of claim 11, wherein the request comprises a request to merge the multiple files to generate the first merged file and send the first merged file to the destination and a second destination, and wherein the sending, from the server to the destination, the first merged file comprises sending the first merged file using a first protocol, the operations further comprising:

sending, from the server to the second destination, the first merged file using a second protocol, the second protocol different from the first protocol.

17. The apparatus of claim 11, the operations further comprising:

converting a format of the first file to a predetermined file format;

converting a format of the second file to the predetermined file format; and converting a format of the third file to the predetermined file format, wherein the generating the first merged file is performed after the format of each of the first file, the second file, and the third file is converted to the predetermined file format, and wherein the merging the first file, the second file, and the third file to generate the first merged file comprises merging the first file having the predetermined file format, the second file having the predetermined file format, and the third file having the predetermined file format to generate the first merged file having the predetermined file format.

18. The apparatus of claim 11, wherein the determining that the third file is a file that may be updated comprises determining that the storage location of the third file corresponds to a folder that contains one or more files that may be updated.

19. The apparatus of claim 11, the operations further comprising:

registering folder information at the server, the folder information corresponding to a folder that contains one or more files that may be updated, wherein the retrieving the multiple files includes retrieving the third file using location information associated with the third file, the location information comprising information for locating the third file, and wherein the determining that the third file is a file that may be updated comprises using the location information and the folder information to determine that the third file is a file that may be updated.

* * * * *